Jan. 12, 1960 K. C. SHERMAN 2,920,891

BOWLING PIN SETTING MACHINE

Filed Aug. 2, 1955 18 Sheets-Sheet 1

INVENTOR.
Kenneth C. Sherman
BY Wright, Brown, Quinby & May Attys.

INVENTOR.
Kenneth C. Sherman
BY Wright, Brown, Quinby & May Attys.

Jan. 12, 1960 K. C. SHERMAN 2,920,891

BOWLING PIN SETTING MACHINE

Filed Aug. 2, 1955 18 Sheets-Sheet 3

INVENTOR.
Kenneth C. Sherman
BY Wright, Brown, Quinby & May Attys.

INVENTOR.
Kenneth C. Sherman
BY Wright, Brown, Quinby & May
Attys.

INVENTOR.
Kenneth C. Sherman
BY
Wright, Brown, Quinby & May
Attys.

Jan. 12, 1960 K. C. SHERMAN 2,920,891

BOWLING PIN SETTING MACHINE

Filed Aug. 2, 1955 18 Sheets-Sheet 6

INVENTOR.
Kenneth C. Sherman
BY Wright, Brown Quinby & May Attys.

Jan. 12, 1960 K. C. SHERMAN 2,920,891

BOWLING PIN SETTING MACHINE

Filed Aug. 2, 1955 18 Sheets-Sheet 7

INVENTOR.
Kenneth C. Sherman
BY Wright, Brown, Quinby & May
Attys.

Jan. 12, 1960 K. C. SHERMAN 2,920,891

BOWLING PIN SETTING MACHINE

Filed Aug. 2, 1955 18 Sheets-Sheet 8

INVENTOR.
Kenneth C. Sherman
BY Wright, Brown, Quinby & May
Attys.

INVENTOR.
Kenneth C. Sherman
BY Wright, Brown,
Quinby & May
Attys.

Jan. 12, 1960 K. C. SHERMAN 2,920,891

BOWLING PIN SETTING MACHINE

Filed Aug. 2, 1955 18 Sheets-Sheet 10

INVENTOR.
Kenneth C. Sherman
BY Wright, Brown, Quinby & May
Attys.

INVENTOR.
Kenneth C. Sherman
BY Wright, Brown, Quinby & May
Attys.

INVENTOR.
Kenneth C. Sherman
BY Wright, Brown, Quinby & May Attys.

Jan. 12, 1960 K. C. SHERMAN 2,920,891

BOWLING PIN SETTING MACHINE

Filed Aug. 2, 1955 18 Sheets-Sheet 13

INVENTOR.
Kenneth C. Sherman
BY Wright, Brown, Quinby & May
Attys.

INVENTOR.
Kenneth C. Sherman
BY Wright, Brown, Quinby & May
Attys.

INVENTOR.
Kenneth C. Sherman
BY Wright, Brown, Quinby & May Attys.

INVENTOR.
Kenneth C. Sherman
BY Wright, Brown, Quinby & May Attys.

INVENTOR.
Kenneth C. Sherman
BY Wright, Brown, Quinby & May
Attys.

INVENTOR.
Kenneth C. Sherman
BY Wright, Brown, Quinby & May Attys.

United States Patent Office 2,920,891

Patented Jan. 12, 1960

2,920,891

BOWLING PIN SETTING MACHINE

Kenneth C. Sherman, Worcester, Mass., assignor to Sherman Enterprises, Inc., Worcester, Mass., a corporation of Massachusetts Application August 2, 1955, Serial No. 526,033

7 Claims. (Cl. 273—43)

This invention relates to bowling pin setting machines and more particularly to an automatic machine adapted to sweep the deadwood pins from the alley following each ball thrown, to remove all pins from the alley to the pit at the end of each play, to return the balls, to remove and regroup the pins from the pit, and to place a frame of pins on the alley ready for the next play, all automatically and under the control of the player.

The space available at the pit end of bowling alleys is ordinarily quite limited and one object of my invention resides in the production of a machine that does not extend beyond the kick-backs at the far end of the pit.

Considerable space is ordinarily available above the pit and the adjacent pin spotting portion of the alley and another object of the invention resides in a machine that utilizes this space and leaves the pit spotting portions of the alley free of obstruction and open to workers for repairs and alley resurfacing.

A further feature of my invention resides in the production of a compact machine powered by a single motor of fractional horsepower together with simple drives therefrom including clutches and controls for automatically operating the related mechanisms in synchronism to perform the required functions.

The invention includes a novel arrangement of conveyors for conducting the pins and balls from the pit, together with other and cooperating mechanism for returning the balls and conveying the pins in predetermined position to a pin holding magazine.

The magazine is of novel U-shape and employs conveyor belts for conducting the pins therethrough and functions together with cooperating mechanism to feed the pins successively to a distributing table including ten cups for receiving the pins in upright position.

The distributor table carries the cups on an endless chain and through a predetermined path automatically disposing the ten pins therein in the triangular spotting arrangement required on the alley.

Cooperating with the distributor table is a pin carrier adapted to grip the pins in the predetermined arrangement, lift them from the table and deposit them in bowling position on the alley, all together with means for automatically moving the table and carrier through motions adapted to perform these functions.

The carrier is also adapted to function, independently of the table, to lift the upright pins on the alley and cooperating therewith is a sweep for removing the deadwood while the upright pins are thus supported in the carrier above the alley.

The functioning of the machine is under the control of the player by means of two push button switches, one switch being adapted to cause operation of the carrier and sweep for removing deadwood, the standing pins being lifted out of the way of the sweep and then replaced, and the other being adapted to start the complete cycle which effects the sweeping of all pins from the alley and the placing of a full stand of pins thereon ready for the next play.

The production of a novel machine embodying the above and other features hereinafter more fully described comprises the primary object of the invention.

These and other features of the invention will best be understood and appreciated from the following description of a preferred embodiment thereof selected for purposes of illustration and shown in the accompanying drawings in which—

Figures 1 and 2, taken together, are a plan view of the mechanism embodying the invention. Figure 1 showing the rear portion, Figure 2 showing the front portion and part of he alley;

Figure 3 is a front elevation of said machine;

Figures 4 and 5, taken together, are a side elevational view of the machine as seen from the right;

Figure 6:
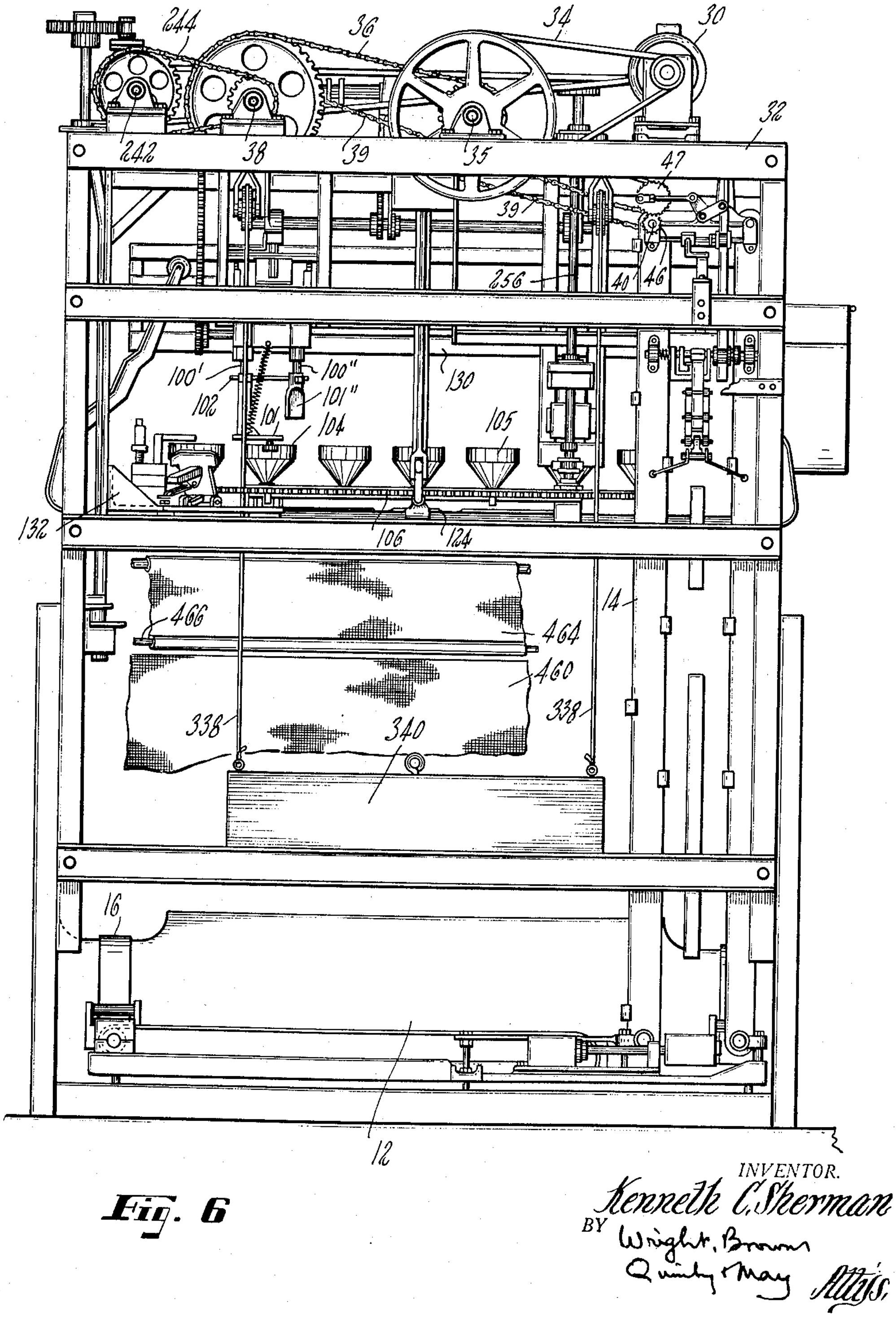
Figure 6 is a rear elevation of the machine.
Figure 7:
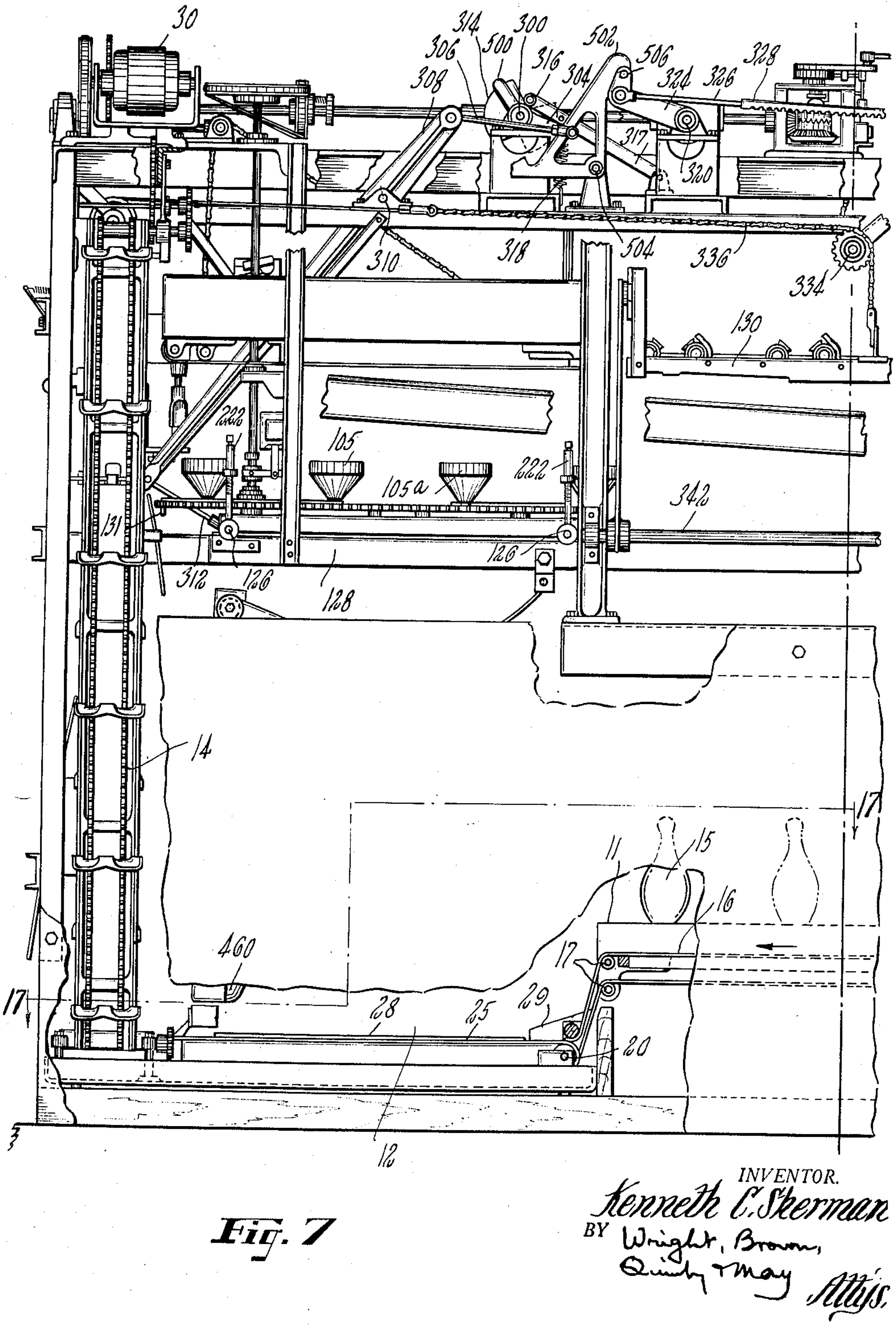
Figures 7 and 8 are a side elevational view of the machine from the left.
Figures 8, 8A:
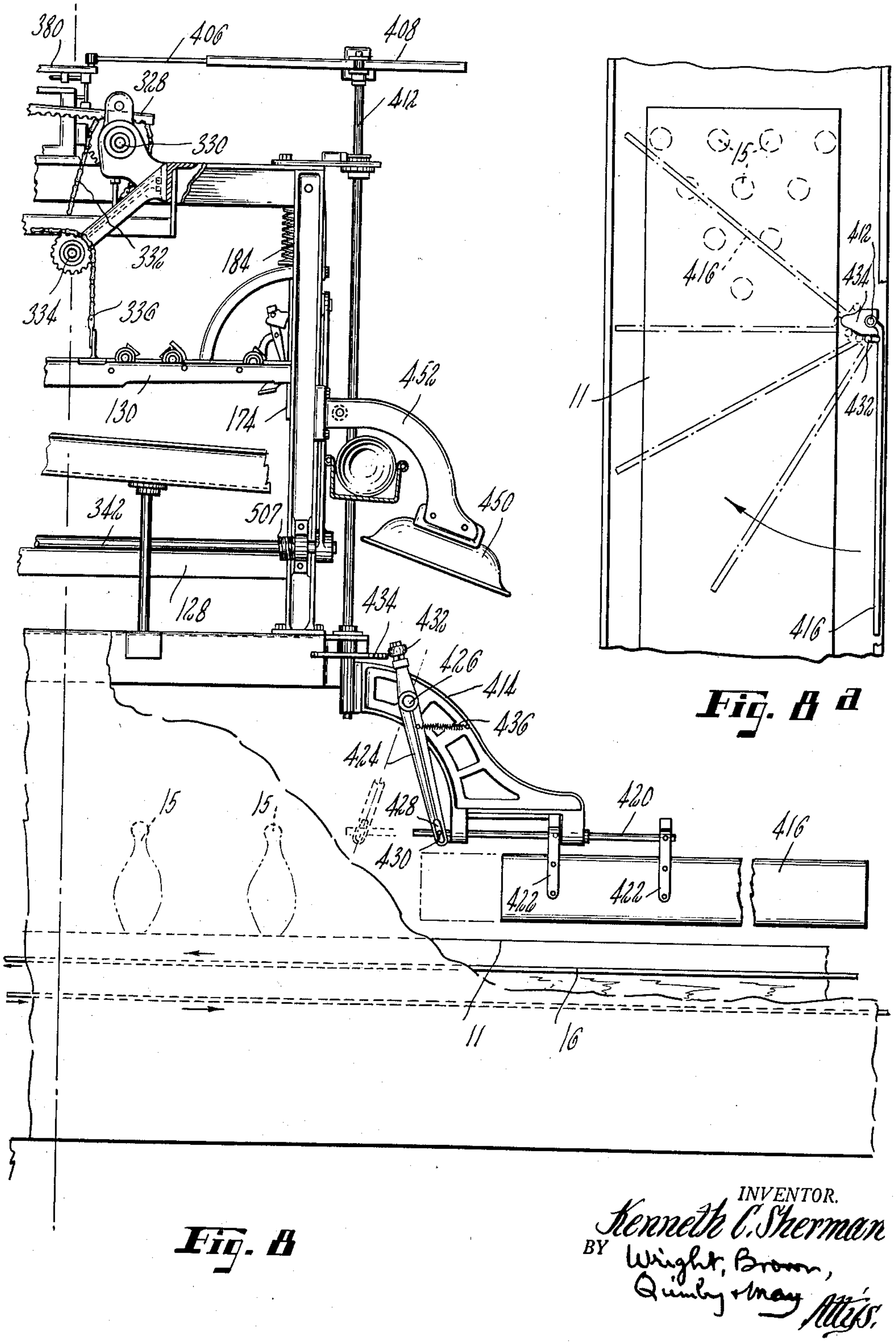
Figure 9:
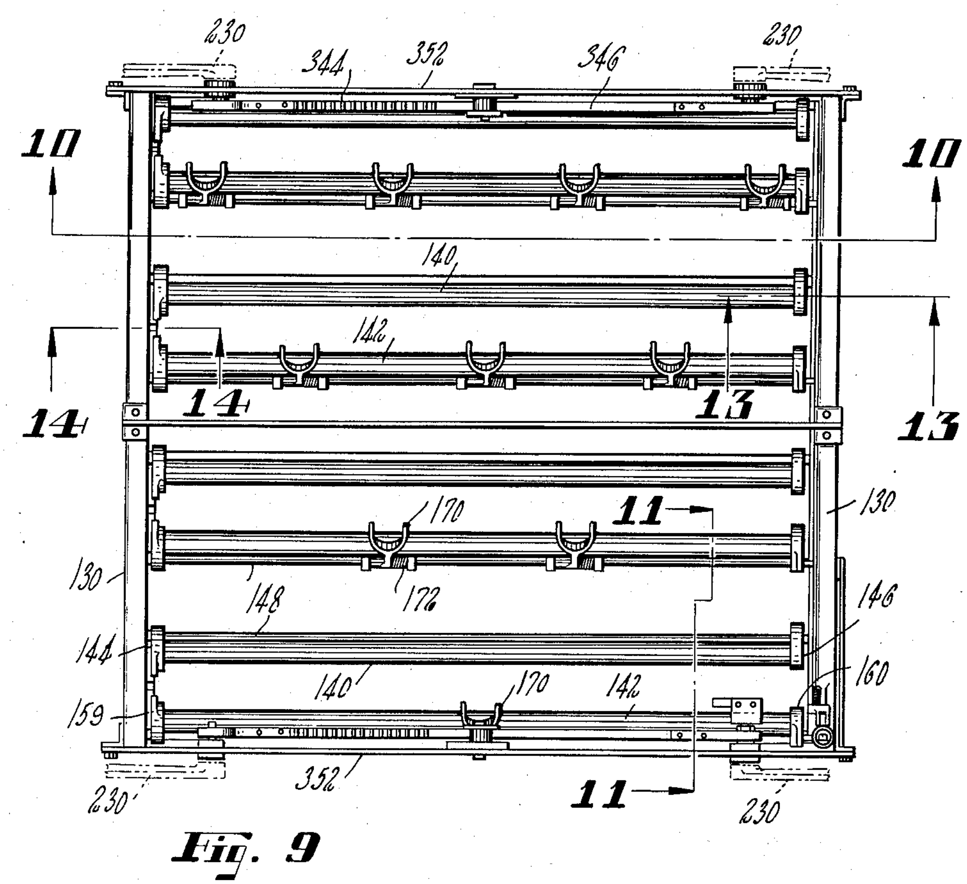
Figure 10:
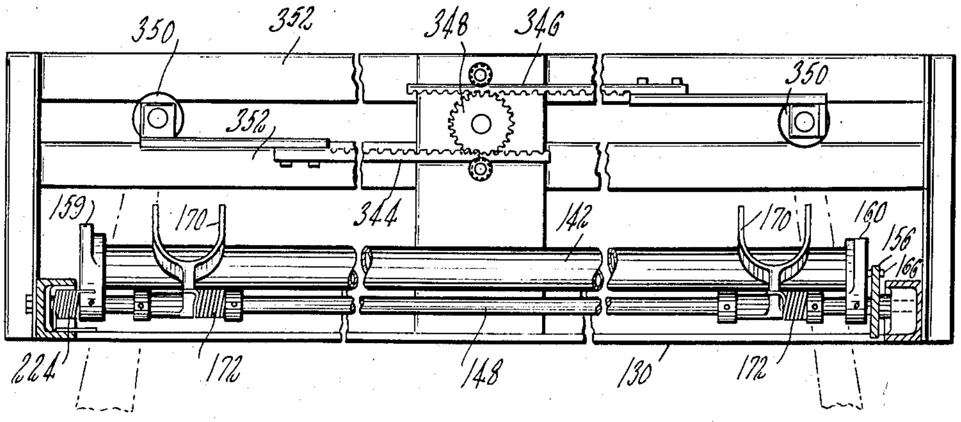
Figures 11, 12, 13, 14:
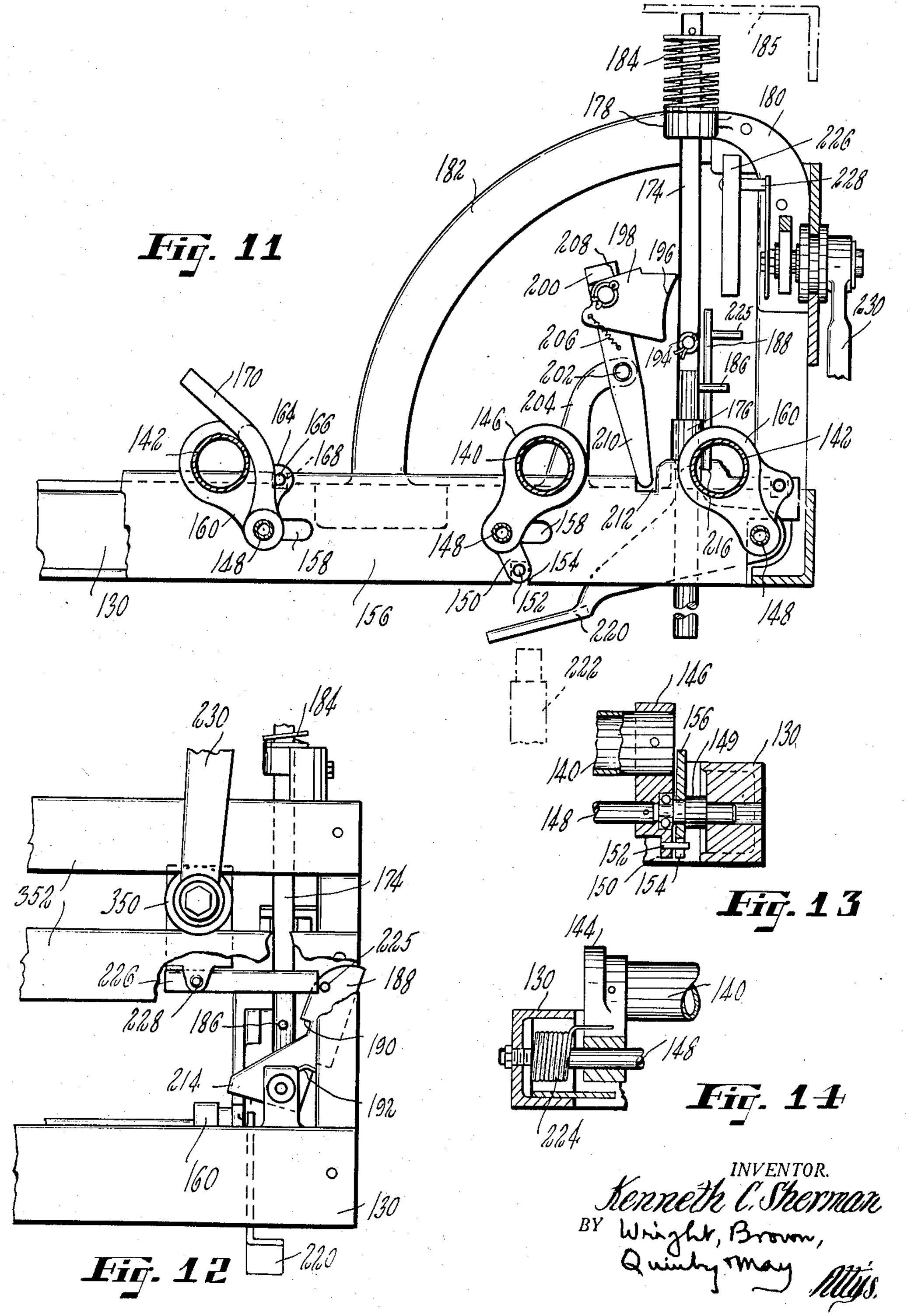
Figures 15, 15A, 16:
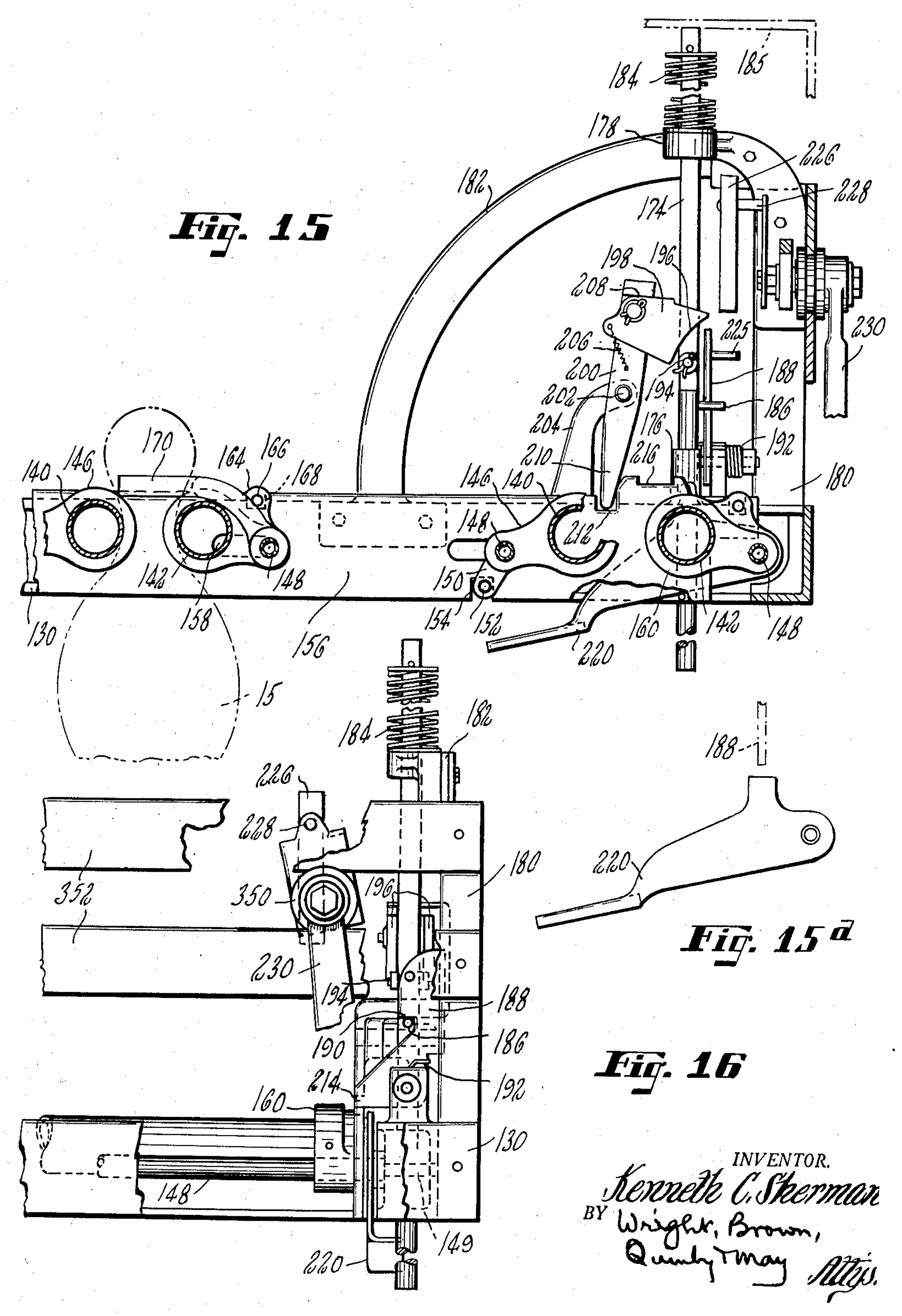
Figure 17:
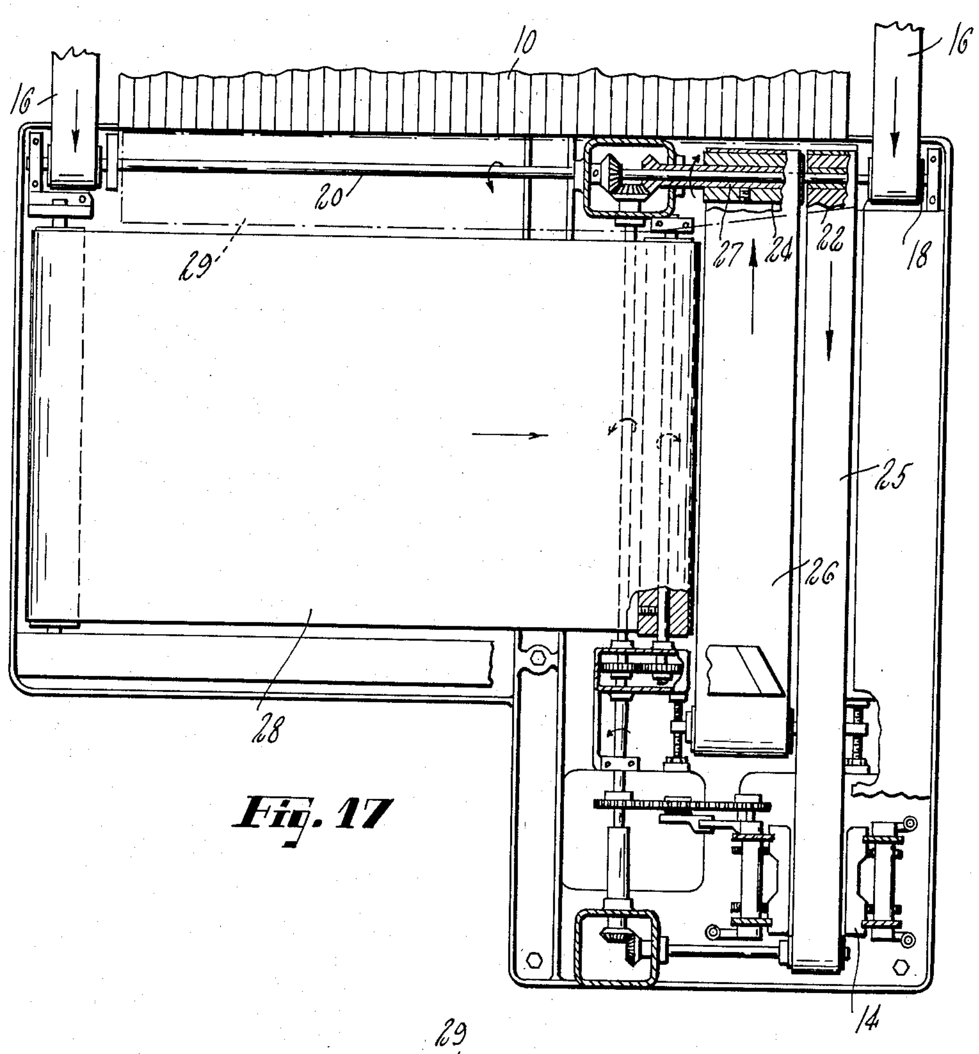
Figure 17A:
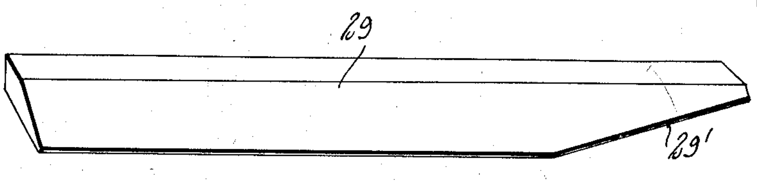
Figure 18D:
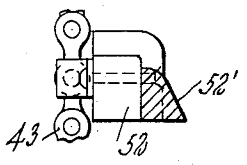
Figure 18:
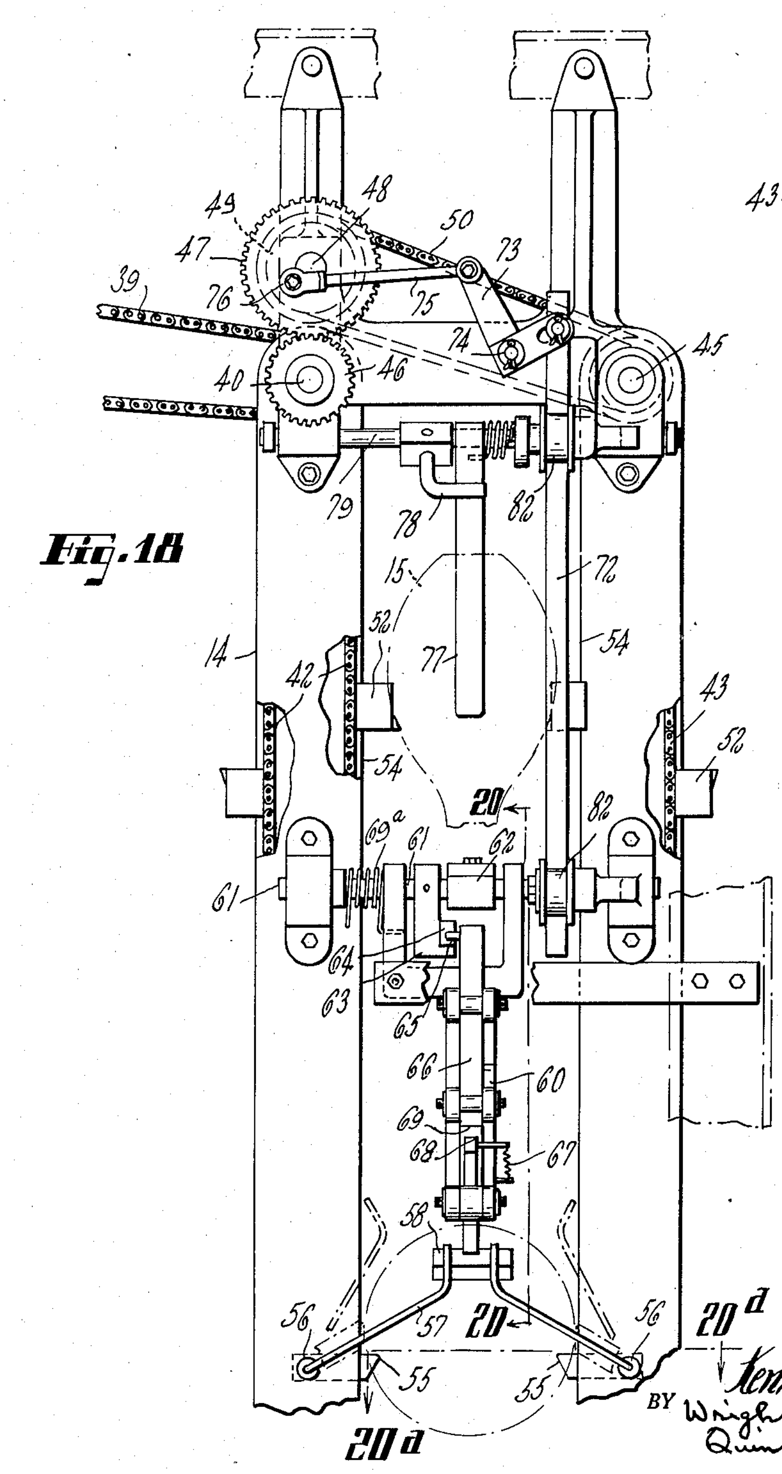
Figures 19, 20:
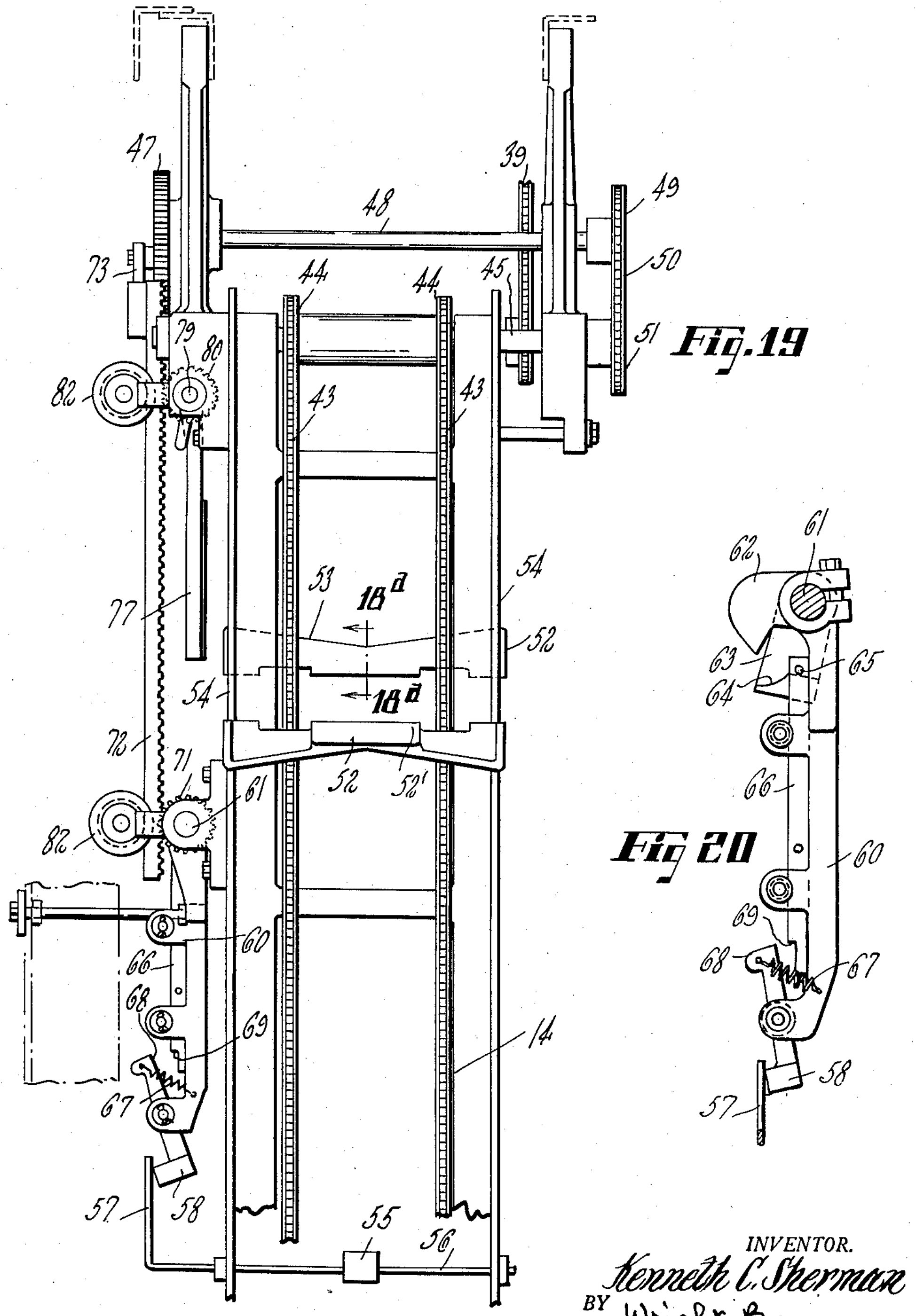
Figures 20A, 21, 21A, 22:
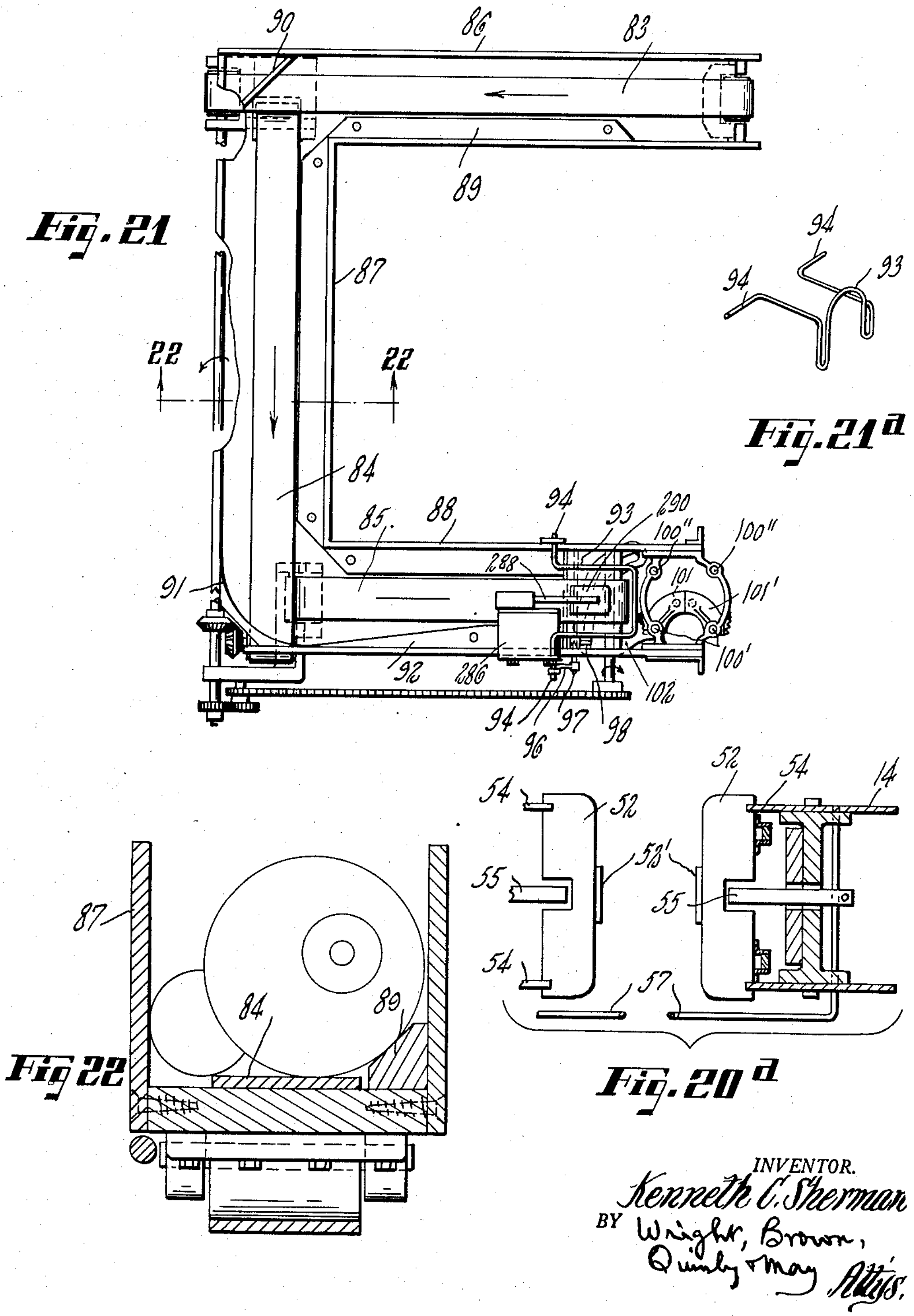
Figure 23:
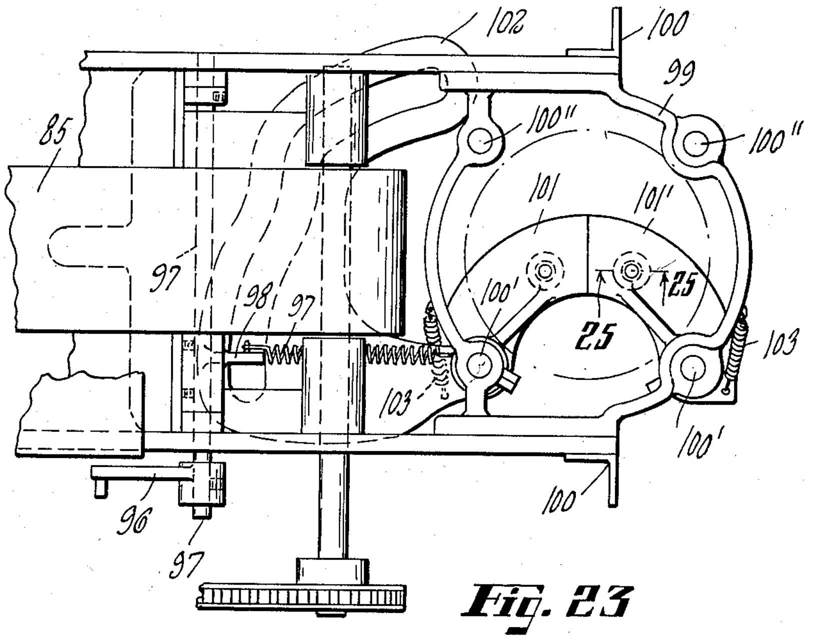
Figure 24:
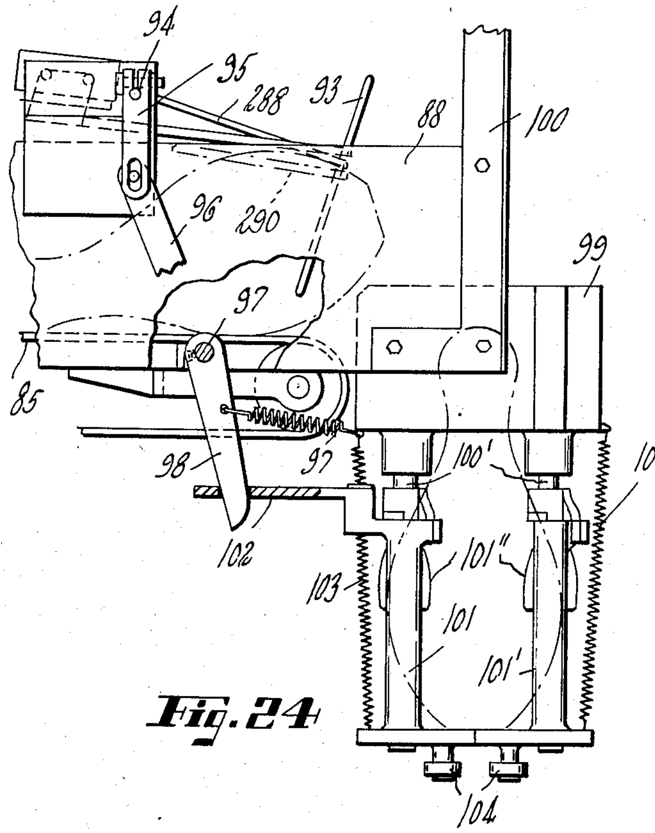
Figure 25:
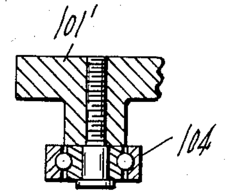
Figure 26:
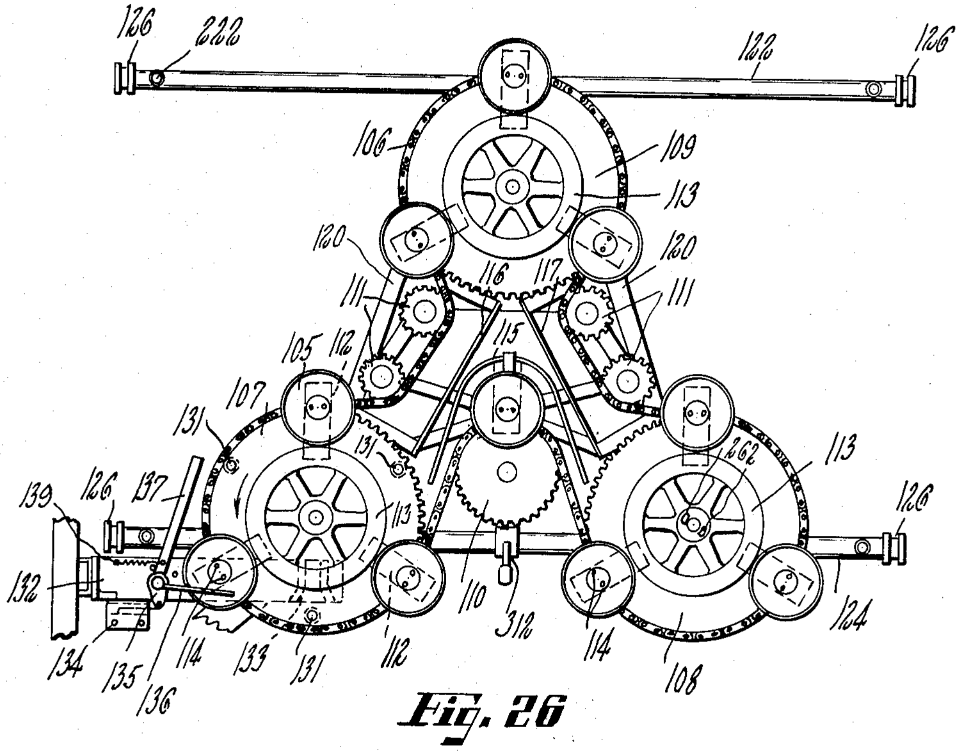
Figure 27:
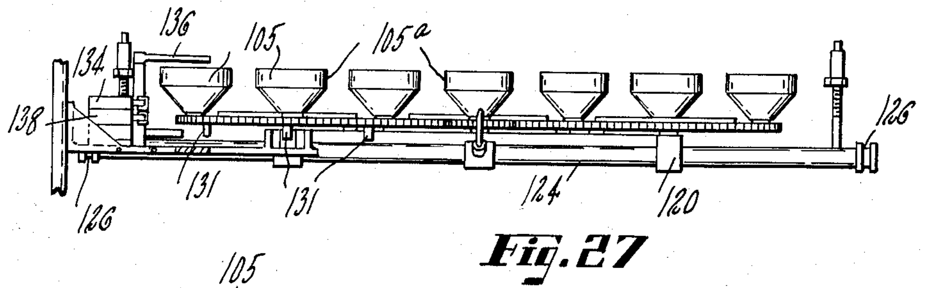
Figure 27A:
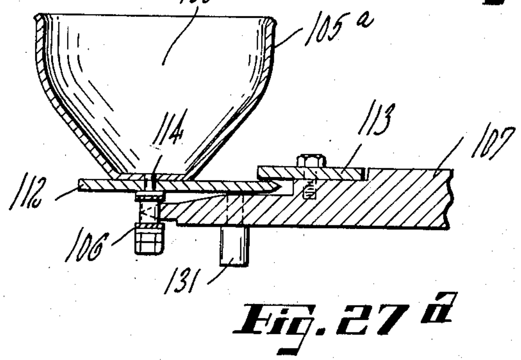
Figures 28, 29, 30, 31:
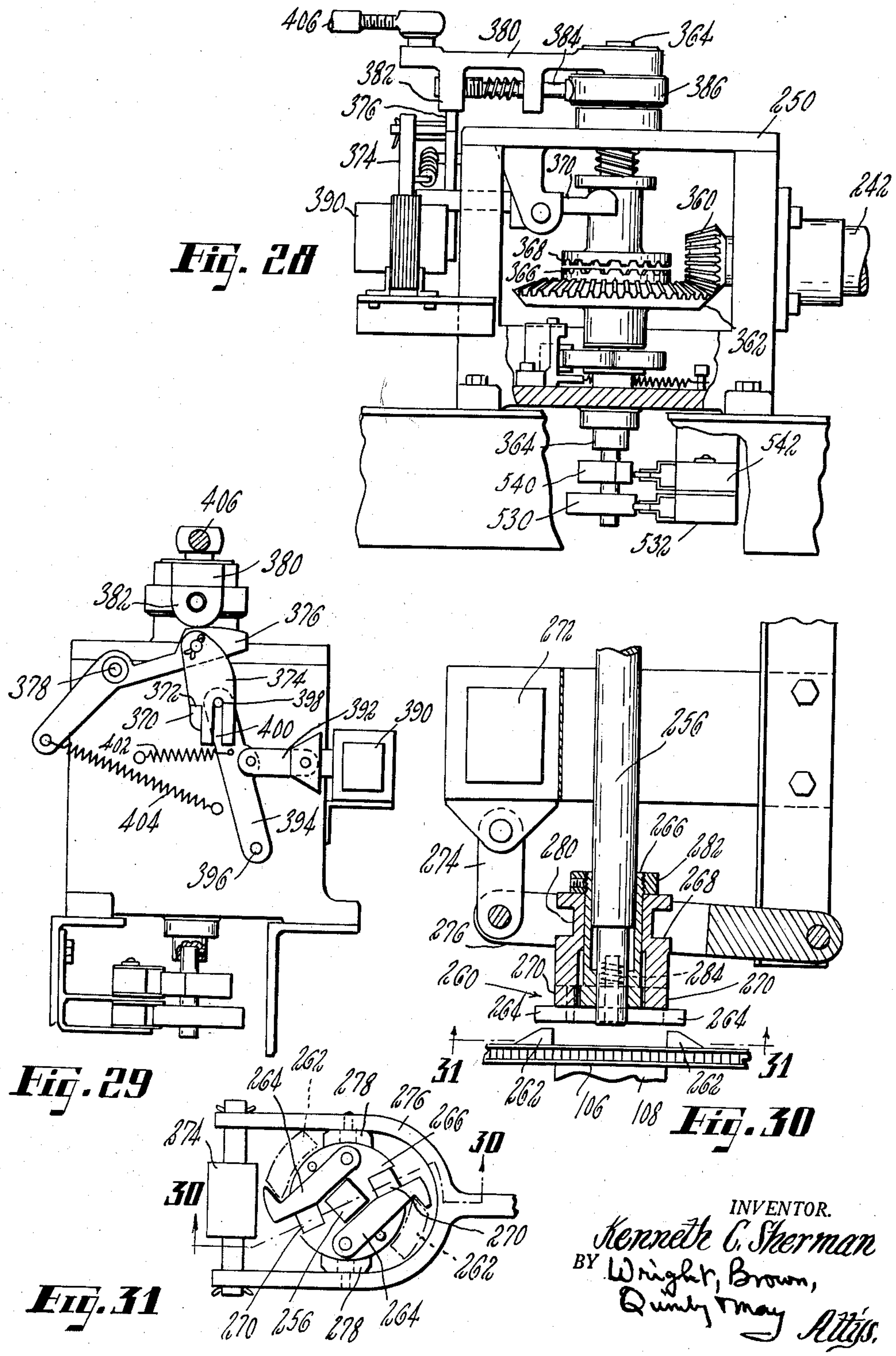

Figure 8*a* is a diagrammatic plan view on a reduced scale, of the rear portion of the alley, showing successive positions of the sweep blade;

Figure 9 is a plan view of the pin setting table carrier;

Figure 10 is a section on the line 10—10 of Figure 9, on a larger scale;

Figure 11 is a section on the line 11—11 of Figure 9, on a larger scale;

Figure 12 is a fragmentary elevation, on a larger scale, of a portion of the table shown in Figure 9;

Figures 13 and 14 are sections on the lines 13—13 and 14—14, respectively, of Figure 9, on a larger scale;

Figure 15 is a view similar to Figure 11, but with the parts in a different position of operation;

Figure 15*a* is a side elevation of a trigger shown in Figure 15;

Figure 16 is a fragmentary elevation of the table in its uppermost position of operation;

Figure 17 is a section on the line 17—17 of Figure 7;

Figure 17*a* is a perspective view of a deflector board;

Figure 18 is a fragmentary elevational view of the elevator mechanism shown on a smaller scale in Figure 6;

Figure 18*a* is a section on the line **18*a*—18*a*** of Figure 19;

Figure 19 is a fragmentary elevational view from the left, of the elevator shown on a smaller scale in Figure 7;

Figure 20 is an enlarged elevation of the ball kick-off mechanism viewed as indicated by the line 20—20 of Figure 18;

Figure 20*a* is an enlarged section on the line **20*a*—20*a*** of Figure 18;

Figure 21 is a plan view of the magazine;

Figure 21*a* is an isometric view of an escapement member;

Figure 22 is an enlarged section on the line 22—22 of Figure 21;

Figure 23 is a plan view, enlarged, of the mechanism at the delivery end of the magazine shown in Figure 21;

Figure 24 is an elevational view of the mechanism shown in Figure 23;

Figure 25 is a section on the line 25—25 of Figure 23;

Figure 26 is a plan view of the distributor;

Figure 27 is an elevation of the same;

Figure 27*a* is an enlarged detail section of a portion of the distributor mechanism;

Figure 28 is an elevation of the sweep gear box as seen from the right;

Figure 29 is a front elevation of the same;

Figure 30 is a section on the line 30—30 of Figure 31; and

Figure 31 is a section on the line 31—31 of Figure 30.

The machine comprising the invention is illustrated in conjunction with a conventional bowling alley including an alley floor 10, a plate 11 on which the pins stand in triangular array, and a pit 12. A constantly driven pin and ball elevator 14 is provided at the rear of the pit, and the machine is particularly adapted to function on pins 15 of the kind having constricted neck portions as illustrated. Disposed in each gutter at opposite sides of the pin spotting portion of the alley is an endless conveyor belt having a top reach 16 for carrying gutter pins to the pit.

Each belt 16 passes over idlers 17 and then downwardly about a driving roll 18 on a shaft 20 (Figure 17). The shaft 20 also carries two rolls 22 and 24 supporting the forward loops of two conveyor belts having top reaches 25 and 26 extending along one side margin of the pit, the roll 22 being pinned on the shaft 20. The roll 24 is secured on a sleeve 27 which is on the shaft 20 but revolves in the opposite direction, so that the belt 26 is driven toward the front. Disposed transversely of the pit is a broad belt having an upper reach 28 which is driven toward the belt 26. A deflector board 29 (Figure 17*a*) is at the forward edge of the belt 28 and crosses over the belts 26 and 25, the board being indicated in Figure 17 by broken lines. The narrowed portion 29′ toward the right causes pins on the belt 26 to be deflected over to the belt 25. The belt 25 is narrower than the body of a pin so that the pins thereon necessarily are in single file.

Pins falling into the gutters are carried into the pit by the belts 16 and these pins together with the balls and other pins from the alley fall onto the conveyor belts and eventually onto the belt 25 which conveys them to the elevator. All these conveyor belts are operatively connected by shafts and gearing indicated in Figure 17 to the constantly driven elevator 14 to be driven thereby.

The entire machine is driven from an electric motor 30 mounted on top of the machine frame 32. Means including a belt 34 from the motor shaft drives a shaft 35 at reduced speed. Means including sprockets and a chain 36 drive a shaft 38 at reduced speed from the shaft 35. Means including sprockets and a chain 39 drive a shaft 40 at the top of the elevator from the shaft 38 (Figures 6 and 18).

Mounted on the shaft 40 are two sprocket wheels (not shown) over which pass two elevator chains 42. Two other elevator chains 43 pass over sprocket wheels 44 on a shaft 45 at the top of the elevator. The shaft 40 carries a spur gear 46 which drives another spur gear 47 of twice the diameter on a shaft 48. On the other end of this shaft (Figure 19) is a sprocket wheel 49. A chain 50 passes over the sprocket wheel 49 and drives a sprocket wheel 51 half the size of the wheel 49 mounted on the shaft 45. This ensures the two sets of elevator chains operating in unison. Each pair of chains 42 and 43 carry a series of spaced lift bars 52. These lift bars operate in pairs, a bar on the chains 42 being opposite a corresponding bar on the other chains 43 during their upward movements. The top surface 53 of each lift bar 52 when it is ascending is slightly inclined from the ends to a low point at its middle (Figure 19) so as to center the ball or pin elevated thereby. The central portion of each bar 52 has a projecting lip 52′ the face of which is inclined to receive and support the body of a bowling pin. The end portions of each bar are vertically grooved to run on vertical rails 54 so as to maintain the lift bars of each pair in accurate spaced relation (Figures 18 and 20*a*).

The spacing between the lift bars of each pair is such that each pin elevated thereby assumes an upside down position regardless of whether the head or butt of the pin reaches the elevator first.

Figure 1:
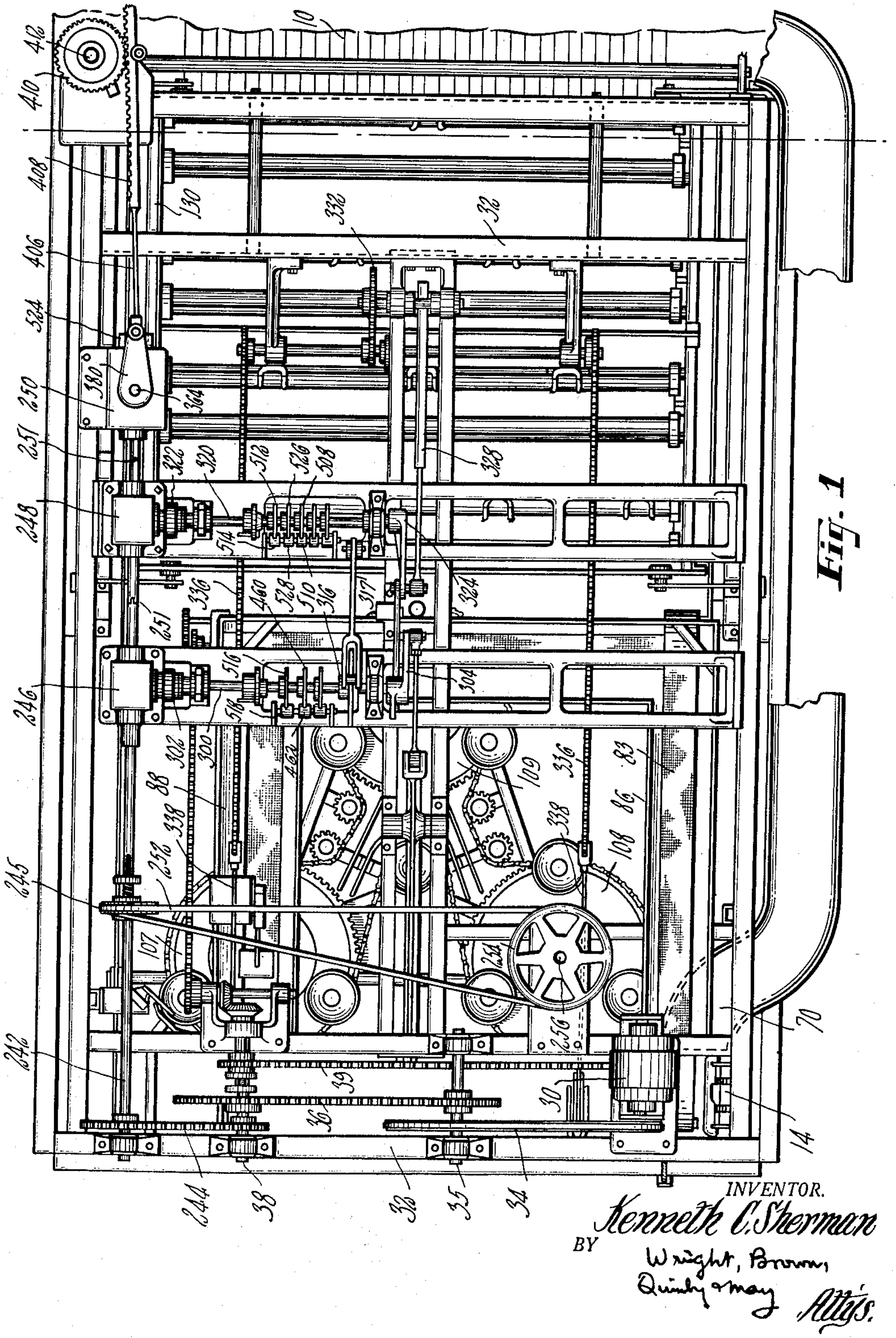

When the balls and pins in the set are carried rearward by the belt 25 into the elevator 14, they are lifted in succession by pairs of lift bars 52 until they reach a ball kick-off device or a pin kick-off device, the latter being higher up. As the ball is being lifted by a pair of bars 52, it rocks a pair of opposed fingers 55 (Figures 18, 19 and 20*a*), each of which is mounted on a rock shaft 56 which extends through rail members 54 and has a crank end 57. The two crank ends 57 normally engage a latch 58 which is pivoted to the lower end of a kick-off lever 60 which has a yoke-shaped upper end and a channeled lower portion. This lever rocks loosely on a shaft 61 (Figure 20). Fixed on the shaft 61 between the arms of the yoke are a dog 62 and an arm 63, the latter having an offset end portion with a cam edge 64. A pin 65 on a slide bar 66 in the channeled portion of the lever 60 rides on the cam edge 64 as the arm 63 is rocked counterclockwise from the position shown in Figure 20. As the pin 65 rides to the low part of the cam 64, the bar 66 slides downward so that the upper end of the slide bar moves out of the path of the dog 62. When the crank ends 57 are moved clear of the latch 58 by a ball which is being lifted by the elevator, the latch is rocked by a spring 67 so that its nose 68 moves into the path of a shoulder 69 on the slide bar 66 so that the latter cannot move downward when the arm 63 rocks with the shaft 61. The upper end of the slide bar 66 is thus kept in the path of the dog 62 which thereupon rocks the kick-off lever 60 against the restoring force of a spring **69*a*, and ejects the ball from the elevator onto a ball return 70 (Figure 1). The shaft 61 (Figure 19) is rocked by a spur gear 71 thereon which meshes with a rack 72 oscillated by a bell crank 73 (Figure 18) pivoted at 74 and connected by a rod 75 to a crank-pin 76 on the gear wheel 47. The latter turns once for every two revolutions of the gear wheel 46 and the shaft 40. Since two revolutions of the shaft 40 are required to advance the elevator chains a distance equal to the spacing between successive lift bars, the kick-off lever operating mechanism makes a working stroke every time a pair of lift bars pass the fingers 55. If a ball is on these lift bars, the kick-off lever rocks to eject it as hereinbefore described. A pin on the lift bars is not wide enough to touch the fingers 55** and therefore continues to travel upward to a pin ejecting mechanism.

The pin ejecting mechanism is a loosely hung lever 77 which is rocked by the arms of a finger 78 secured to a rock shaft 79. This shaft is rocked by the rack 72 which meshes with a pinion 80 on the shaft 79. The rack 72 is held in mesh with the pinions 71 and 80 by guide rolls 82.

When a pin is kicked from the elevator, it goes butt-first into a magazine (Figure 21) which is a U-shaped trough having a series of three conveyor belts 83, 84 and 85 running in channels 86, 87 and 88 respectively. Each channel has a beveled guide piece 89 (Figure 22) to prevent the heads of the pins in the channels from swinging to the inner wall. At the end of the channel 86 is a deflector 90 to turn pins into the channel 87. Another deflector 91 turns the pins from the channel 87 into the channel 88 at the end of the latter. As the pins enter the channel 88 they overlap each other, with the heads toward the outer wall. To straighten each pin on the belt 85 as it approaches the discharge station, a second beveled guide piece 92 is in the channel 88 (Figure 21). As a pin approaches the end of channel 88, butt-first, it engages and is stopped by an escapement member consisting of a yoke 93 which has aligned oppositely projecting end extensions or trunnions 94 journalled in the walls of channel 88. Succeeding pins back up in the channels of the magazine behind each other and are hitched forward by the belts on which they rest each time the leading pin is discharged from the magazine. Secured to one of the extensions is an arm 95 (Figure 24) which is connected by a pin and slot connection with an arm 96 fixed on a shaft 97. Also mounted on the shaft 97 is a finger 98 which is rockable as hereinafter described to lift the yoke 93 and release the leading pin in the magazine.

Figure 5:
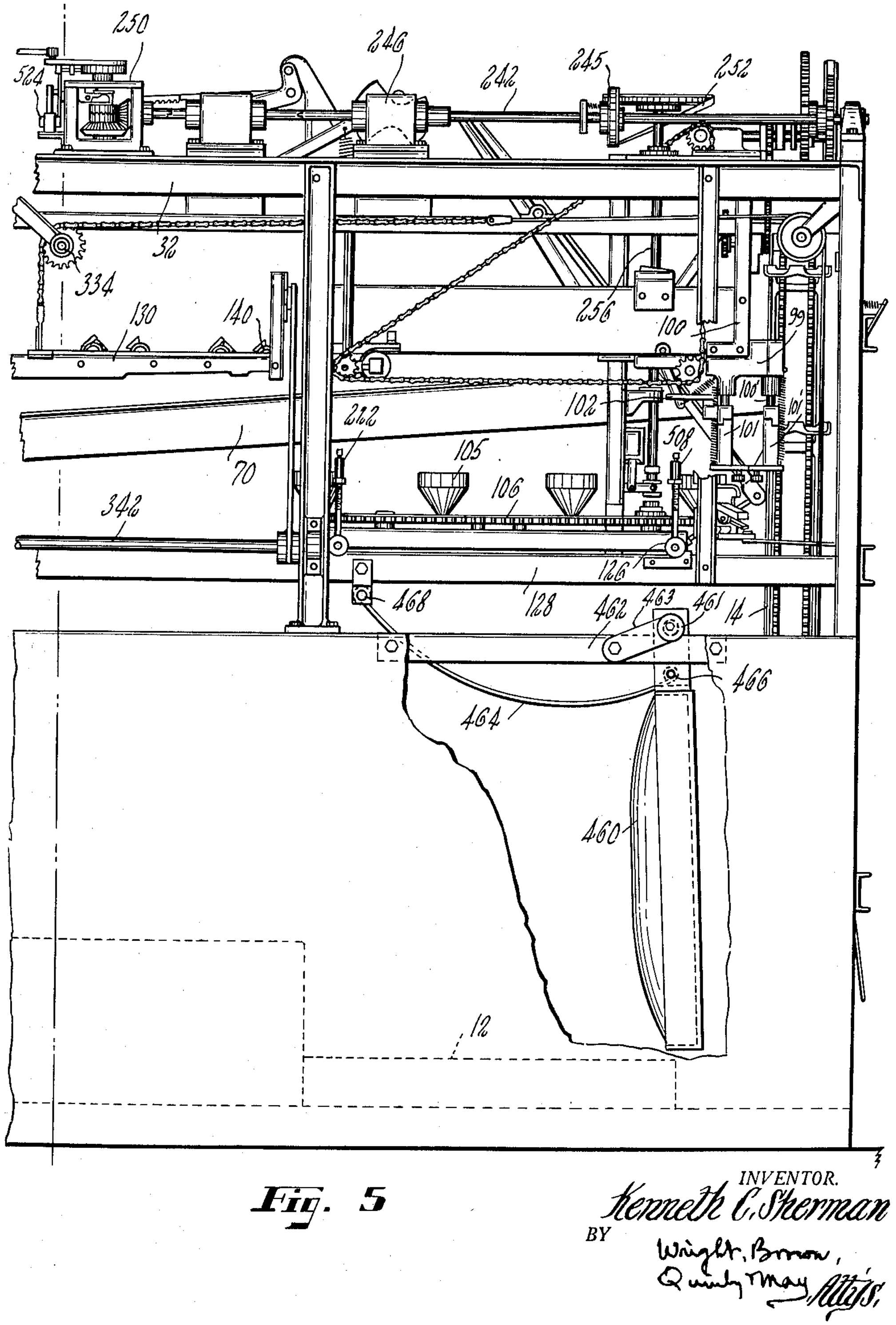

At the end of the magazine channel 88 is a pin-receiving bucket comprising a short, generally cylindrical casing 99 secured to brackets 100 (Figures 5 and 24) which also support an end of the magazine. Below the casing 99 four rods project downward. Slidable and rockable on two of these rods 100′ are horizontal pin support members or gates 101 and 101′ (Figures 23 and 24). The other two rods 100″ support guide plates 101″ (Figures 6 and 24) which keep the pin in the bucket in an upright position, especially when the gates 101 and 101′ are being swung apart as hereinafter described. When the gates 101 and 101′ are in the position shown in Figure 23, a pin in the bucket is retained therein. Ordinarily there is always a pin in the bucket except when a pin is in the process of being discharged therefrom and being replaced by another. The gates 101 and 101′ are operated by cups of a distributing mechanism hereinafter described.

When the gates 101 and 101′ are swung apart to discharge the pin from the bucket, a cam member 102 on the gate 101 rocks the finger 98 and the arms 96 and 95 to raise the yoke 93 so that the leading pin detained thereby is immediately delivered into the bucket, but not before the gates 101 and 101′ are swung back to the pin supporting position shown in Figure 23 by suitable springs 103 which are arranged to hold up the gates resiliently as well as to swing them. When a pin from the magazine falls into the bucket, the springs 103 allow the gates 101 and 101′ to yield downward to cushion the impact of the pin thereon. The closing of the gates 101 and 101′ causes the cam 102 to lower the yoke 93 in time to intercept the next pin advancing in the magazine.

For the operation of the gates 101 and 101′ each is provided with a roller 104 on a stud projecting below it (Figures 24 and 25). The purpose of the bucket is to feed successive pins into successive cups 105 of a distributing mechanism (Figures 6 and 26) which arranges the pins in the standard triangular array for setting on an alley. The cups are ten in number and are spaced on an endless chain 106 which passes around three sprocket wheels 107, 108 and 109, and which also meshes with idle sprocket wheels 110 and 111. As indicated in Figure 26, the sprocket wheels 107, 108, 109 and 110 are so arranged and the spacing between successive cups 105 is such that when the cups are in the positions shown they are properly arranged for setting on an alley.

Each cup 105 has a cylindrical rim 105*a* adapted to pass between the rollers 104 on the bottoms of the gates 101 and 101′ and to wedge the gates apart sufficiently to enable the pin in the bucket to drop into the cup 105 passing beneath. As hereinbefore described, the opening of the gates not only releases the pin in the bucket but also releases the leading pin in the magazine to drop into the bucket after the gates have been closed by the springs 103. When the pin drops into a cup 105 the neck of the pin is then on a level with the guide plates 101″ which are so spaced apart that the neck of the pin can pass between them. This operation is repeated until all the cups are filled.

To maintain the cups 105 on an even keel, a horizontal plate 112 is secured to the bottom of each. An end portion of each plate 112 engages in a groove between a face of one of the sprocket wheels 107, 108 and 109 and an annular ring 113 secured to each wheel. Each cup is secured to its plate 112 and to the chain 106 by two pins 114, these pins also connecting together successive links of the chain 106. Guide rails 115, 116 and 117 are mounted in positions to support the plates 112 when the cups are travelling from one sprocket wheel to the next. The sprocket wheels of the distributor are mounted on a frame 120 which may be in the form of a single casting. A pair of tubes 122, 124 extend through holes in the frame 120 and are rigidly secured thereto. On the ends of the tubes 122 and 124 are rollers 126 which ride on horizontal rails 128 (Figures 3, 4, 5, 7) to carry the distributor forward from the loading position which it occupies when receiving pins from the bucket. This movement is to transfer the pins in the cups from the loading station to a forward position under a pin setting table 130 which is provided with pin gripping means as hereinafter described. When the distributor moves to its forward position, it is important that the cups be exactly arranged relatively to one another in the standard triangular array. For this purpose three studs 131 are mounted on the sprocket wheel 107. Some one of these is always half way between two of the cups at the rim of the sprocket wheel 107 when all the cups have been filled. A guide bracket 132 projects out from the main frame and carries two converging guide elements 133 between which one of the studs 131 must pass when the distributor is shifted forward. The cups are so located on the chain 106 that whenever one of the studs 131 is aligned with the axis of the sprocket wheel 107 in the front-to-rear direction, the cups will then be accurately located with respect to one another. The guide channel between the elements 133 is aligned with the center of the wheel 107. When the distributor shifts (Figure 26), one of the studs 131 is guided into the channel and is thus accurately aligned with the center of the wheel 107. This correctly positions all the cups relatively to one another. Ordinarily, however, the distributor chain will be stopped, after the tenth pin has been received from the bucket, at the instant when the cups are correctly positioned.

For this purpose a clutch (hereinafter described) through which the chain 106 is driven is automatically disengaged by energization of a solenoid 272 (Figure 30) which is in a circuit in series with a micro-switch 134. This switch is closed by contact with a cam 135 rockable with a spring arm 136 which extends into the path of a pin carried by one of the cups 105. The loading station for the cups is approximately over the guide 133 so that when the cups begin to be filled, they pass empty under the arm 136 until the cup first to be filled arrives with a pin therein. When this happens, the pin rocks the arm 136 to close the switch 134. This disengages the driving clutch and stops the drive of the distributor chain 106. By this time, all of the cups 105 have been filled. To prevent any possible overrunning of the chain 106 which might carry the stud 131 which should be in line with the guide 133, beyond the guide, an arm 137 is provided to rock with the spring arm 136 to a position in the path of movement of the studs 131, the arrangement being such that when a stud 131 hits against the end of the arm 137, one of the other studs 131 is then in line with the guide 133.

The cam 135 also operates another microswitch 138, located under the switch 134, which conditions the apparatus to respond to the pressing of a reset button (not shown). When the distributor shifts forward, the arms 136 and 137 are returned to their normal positions by a spring 139 and the switches 134 and 138 are opened.

The pin setting table 130 is directly over the pin plate, that is, the portion of the alley on which the pins stand when set up, and is vertically movable from a normal position above the level of the distributor. The table includes a rectangular frame on which are mounted four sets of tubular bars 140 and 142. A description of one set will serve for the others. The bars of each set are adapted to move to and from each other to grip or release pins. For this purpose each bar 140 is mounted on a bracket 144 at one end and a bracket 146 at the other end (Figure 9, 11, and 14). The brackets are pinned on a rod 148 which is preferably hollow for lightness and is rockably supported at one end by the table 130 and the other end by a stud 149 projecting from the table 130 into the bracket 146 (Figure 13). The bracket 146 is supplied with a tail 150 which carries a stud or roller 152 engaging in a notch 154 in the lower edge of a slide bar 156. The slide bar is supported by the studs 149 which pass through horizontal slots 158 therein. In like manner the bars 142 are mounted on brackets 159 at one end and brackets 160 at the other end. The brackets 160 are rockably supported on studs similar to the studs 149 which are fixed in a side member of the table 130. The brackets 159 are pinned to rods 148 in the same manner as the brackets 144. Each bracket 160 has a lug 164 carrying a stud or roller 166 which rides in a notch 168 in the upper edge of the slide bar 156. When the slide bar is shifted forward or rearward, the bars 140 and 142 move toward or from each other to grip by the neck pins which may be between them, or to release pins held thereby. Figure 11 shows the bars open; Figure 15 shows them closed.

Each of the bars 142 has one or more centering devices (Figures 10 and 11) comprising a yoke 170. Each yoke is rockably mounted on one of the rods 148 and is resiliently pressed in a counterclockwise direction (Figure 11) by a light spring 172 (Figure 10) one end of which is pinned to the rod 148. The centering devices are adjusted to be directly over the pin spots on the alley plate so that when pins are deposited on the plate they are accurately placed where they belong. When the table moves down for a deadwood operation, if any of the standing pins have been laterally displaced so that a centering device comes down on it, the device can readily yield by rocking back against the light pressure of its spring 172.

For the operation of the bars 140 and 142 the table 130 carries at one corner a vertical rod 174 (Figures 3, 8, 11, 15) which is vertically movable with respect to the table and extends through a guide bearing 176 and an upper bearing 178, the latter being mounted on a corner post 180 of the table which has a stiffening brace 182. When the rod 174 is in its low position relative to the table, the bars 140 and 142 can be released to fall to the closed position by their own weight. When the rod 174 is raised to its upper relative position, it opens the bars 140 and 142 by means to be described. To elevate the rod 174 a compression spring 184 is provided on the upper end portion thereof between the guide bearing 178 and a cotter pin in a hole through the rod near its upper end. A number of such holes may be provided so that the tension of the spring can be adjusted by selecting another hole for the cotter pin. This spring supports the rod. When the table 130 is raised to its uppermost position the upper end of the rod comes up against an adjustable stop 185 (Figure 15) attached to or a part of the main frame, before the table has reached its uppermost position. The final upward movement of the table compresses the spring 184. During such movement, the rod remains stationary with respect to the main frame, that is, it moves downward relatively to the table. Projecting from the rod 174 is a stud 186 which is adapted to cooperate with a latch 188 (Figure 12) pivotally mounted on the table frame. When the rod 174 moves down (relatively to the table) the stud 186 engages under a nose 190 on the latch 188 if at that time the latch is free to rock to the position shown in Figure 16 in which the nose 190 is far enough to the left to catch on the stud 186. This occurs when the bars 140, 142 are closed as shown in Figure 15. A spring 192 presses the latch into engaging position with the stud 186. This holds the rod 174 down with the spring 184 compressed until the stud 186 is released. When the stud 186 is released, as hereinafter described, the spring 184 suddenly elevates the rod 174 relatively to the table, swinging the gripper bars 140, 142 to their open position. For this purpose, two rollers 194 on the rod 174 engage cams 196 of parallel pawls 198 when the rod rises. These pawls are pivoted on a rocking lever 200 which is pivoted at 202 to a bracket 204 fixed on the table 130. Tension springs 206 holds the pawls against stops 208 on the lever 200. The rollers 194 rock the lever 200 counterclockwise (Figures 11 and 15). The lower end 210 engages in a notch 212 in the upper edge of the slide bar 156 so that the rocking movement shifts the slide bar to the right and opens the bars 140, 142 (Figure 11). The bars are held open by engagement of the toe 214 of the latch 188 in a notch 216 (Figures 11 and 15) in the slide bar 156. The bottom of the notch 216 is sufficiently higher than the upper edge of the slide bar 156 to hold the nose 190 clear of the stud 186 (Figure 12) when the toe 214 is in the notch 216 so that spring 184 cannot be locked in its compressed condition when the bars 140, 142 are open, but when the slide 156 is released to be shifted to the left by the closing of the gripper bars 140, 142, the toe 214 is then over part of the top edge of the slide bar so that it does not hold the nose 190 clear of the vertical path of the stud 186.

The bars 140, 142 when released, close by their own weight. They can be released in two ways. In the reset operation, hereinafter described in detail, when the table 130 descends to take pins from the distributor, a trigger 220 pivoted on one of the studs 149 (Figure 13) engages a post 222 extending up from the distributor and is rocked thereby to push up the toe 214 of the latch 188 (Figures 15*a* and 16) out of the notch 216. This releases the slide bar 156 whereupon the bars 140, 142 fall toward each other to their closed position. This movement of the bars is cushioned by the provision of one or more springs 224 (Figures 10 and 14) which act as counterweights. In the deadwood operation when the table 130 descends to pick up the standing pins, a stud 225 on the latch 188 is hit by a bunter 226 (Figures 12 and 16) which is pivotally mounted at 228 on one of four rock-arms 230 which swing down as the table descends to keep the moving table in a vertical path as hereinafter described. When the bunter 226 strikes the stud 225, it rocks the latch 188 and releases the rod 164 which is instantly thrust up by the compressed spring 184 so that the rollers 194 kick the pawls 198 and rock the lever 200 to open the bars 140, 142 against gravity. As the rod 174 rises, the stud 186 lifts the bunter 226 clear of the stud 225 and flops it over to the left, permitting the latch 188 to rock so that its toe 214 enters the notch 216 in the slide bar to lock the bars 140, 142 in their open position.

It may be noted that whenever the table 130 descends to its lowermost position, it either picks up pins from or deposits pins on the alley. Hence at such moments there is always either a closing or an opening of the gripper bars. In other words, when the table descends with its gripper bars open, the bars close when the table reaches the end of its descent, and whenever it descends with its gripper bars closed, the bars are opened when the table reaches the end of its descent. In each case the change is brought about by the bunter 226 striking the stud 225 to rock the latch 188, the difference being in the position and function of the latch when it is rocked by the bunter. Thus when the table descends with the bars open, the toe 214 is in the notch 216 to hold the bars open until the latch is rocked by the bunter to dislodge the toe 214 from the notch and permit the bars to close. When the table descends with the bars closed, the stud 186 is under the nose 190 holding the rod 174 down with the spring 184 compressed. The bunter then rocks the latch 188 to release the stud 186, permitting the spring 184 to open the bars as hereinbefore described.

The motor 30 drives the distributor, the pin setter table and the sweep mechanism in addition to the elevator and pit conveyors hereinbefore described. Sprocket wheels on the driven shaft 38 and a shaft 242 are connected by a chain 244. On the shaft 242 is a pulley 245 with an overload-disconnecting device for operating the pin cups 105. The shaft 242 also runs to three gear boxes 246, 248 and 250 which reduce the speed for driving the distributor frame, the pin setting table and the sweep mechanism respectively.

For ease in aligning the shaft 242 and for convenience in removing or replacing any of these gear boxes, the shaft is divided into sections connected by universal joints 251 between the gear boxes.

The pulley 245 is connected by a belt 252 to a pulley 254 on a vertical shaft 256 which is connectible to the sprocket wheel 108 by a clutch mechanism 260, shown in Figures 28 to 31, to drive the chain 106 so as to carry the cups 105 in succession to the loading station at the discharge end of the magazine. For this purpose the sprocket wheel 108 has two lugs 262 thereon near its axis. These lugs are engageable by hooks 264 which are rockably mounted on a clutch body 266, the latter being slidable on the squared lower portion of the shaft 256 but always rotating therewith. A sleeve 268 is slidable on the body 266 a limited distance. The sleeve 268 has two fingers 270 projecting downward in lateral notches in the body 266. The lower ends of the fingers 270 are vertically movable into position back of the hooks 264 to prevent the latter from rocking inward to release the lugs 262 when they are engaged therewith. The bills of the hooks 264 are shaped so that the pressure thereof on the lugs 262 tends to disengage the hooks from the lugs. Such disengagement is prevented by the fingers 270 when the latter are back of the hooks. The vertically slidable sleeve 268 and body 266 are movable upward by a solenoid 272 acting through a link 274 and a fork 276. The arms of the fork 276 carry shoes 278 which project into a circumferential groove 280 in the sleeve 268. When the solenoid is energized to disengage the clutch, the sleeve 268 is first lifted, retracting the fingers 270 from behind the hooks 264. When the sleeve hits a collar 282 on the upper end of the clutch body 266, the latter is thereupon lifted to raise the hooks 264 above the level of the lugs 262. The hooks 264 are pressed yieldingly outward by springs 284 so that if the load pressure between the lugs 262 and hooks 264 should force the latter inward when the backing fingers 270 are retracted upward, the hooks would be swung out again as soon as they were raised clear of the lugs 262. When the solenoid 272 is deenergized, the clutch assembly drops by gravity for engagement of the hooks 264 with the lugs 262.

In order to prevent operation of the distributor chain when no pin is in the magazine, a switch 286 (Figure 21) is connected in series with the solenoid 272. This switch is operated by an arm 288 carrying a feeler plate 290 which normally rests on the flank of the leading pin at the exit end of the magazine and holds the switch 286 open. The feeler plate is of sufficient length to be held up continuously by pins passing thereunder in close succession. If, however, the supply of pins at the exit end of the magazine fails the arm 288 falls and closes the switch 286. This causes the solenoid 272 to be energized, disconnecting the clutch through which the distributor chain is driven. Hence, the distributor chain cannot be driven unless a pin is present at the exit end of the magazine.

The distributor frame is shifted back and forth on the tracks 128 by a shaft 300 connectible to the gear box 246 by a clutch 302, this clutch being of a type which automatically disconnects after half a revolution. On the shaft 300 is a crank arm 304 (Figure 7) connected by a rod 306 to a lever 308 pivoted at 310 to the main frame. The other end of the lever is connected by a link 312 to the tube 124 which is a part of the distributor frame. The clutch 302 is engaged electrically as hereinafter described and is disengaged mechanically. Each engagement of the clutch 302 results in a shift of the distributor in one direction only. The first half revolution of the shaft 300 shifts the distributor forward, the second half revolution shifts it back again.

The shaft 300 also carries a cam member 314 in the form of a disk with two opposed recesses into which a roller 316 carried by an arm 317 is pressed by a spring 318 so as to hold the distributor releasably but exactly in its forward or rearward position.

The pin setting table is raised and lowered by power supplied through the gear box 248. The shaft 320 is connectible through a one-revolution clutch 322 to the gear box 248. On one end of this shaft is a crank arm 324 (Figure 7) which is connected by a rod 326 to a rack 328. The rack meshes with a pinion on a counter shaft 330 (Figure 8) which is connected by sprocket wheels and a chain 332 to a shaft 334. This shaft has two sprocket wheels at its ends which drive two chains 336. One end of each of these chains is attached to a side bar of the table 130. The other end of each chain is connected through a cable 338 to a counterweight 340 (Figure 3) the weight of which is equal to that of the table. The gear connections between the crank arm 324 and the table 130 are such that half a revolution of the arm corresponds to a movement of the table from its uppermost position to its lowermost position. The latter position is the one assumed when pins are released or seized on the alley. A complete revolution of the arm 324 results in a movement of the table down and then up through its maximum range of travel.

The table 130 must be maintained level during its movements up and down. For this purpose the four arms 230 are fixed at their lower ends on horizontal shafts 342 so that the arms of each pair rock in unison, thus maintaining the fore and aft level of the table. The opposed arms 230 are connected by parallel racks 344 and 346 (Figures 9 and 10) which are respectively attached to the upper ends of the arms 230 and mesh with a common idle pinion 348. At the junction of each arm 230 and its rack is a grooved roller 350 which runs between horizontal transverse rails 352 of the table 130 and provides the contact between the arm and the table. The grooves of the rollers 350 hold the table against fore and aft displacement. The racks 344 and 346 with their connections keep the travel of the table in a strictly vertical path. The chains 336 which pass over sprocket wheels mounted on a common shaft maintain the transverse level of the table.

For the operation of the sweep mechanism a pinion 360 (Figure 28) is mounted on the end of the shaft 242 within the gear box 250. The pinion meshes with a gear wheel 362 which turns idly on a vertical shaft 364. Integral with the gear wheel 362 is a clutch member 366 adapted to mesh with a clutch member 368 splined on the shaft 364. The clutch is normally held disengaged by a clutch release lever 370 the forked end of which engages under a flange on the clutch member 368. The other end of the lever 370 engages a shoulder 372 (Figure 29) on a latch member 374 which is pivoted at its upper end to a rock arm 376 pivoted at 378 to a wall of the gear box. An end of the rock arm 376 engages a horizontal arm 380, a lug 382 of which bears on the rock arm. The arm 380 is mounted on the shaft 364 to rotate counterclockwise therewith (Figure 1) when the clutch members 366 and 368 engage. For a safety release, the arm 380 is not fixed directly on the shaft 364 but is releasably connected thereto by a spring-pressed detent 384 which engages in a V-notch in the periphery of a disk 386 keyed to the shaft 364. One revolution of the arm 380 operates a sweep blade back and forth as hereinafter described.

To initiate an operation of the sweep, a solenoid 390 is energized. The armature of the solenoid is connected by a link 392 to a lever 394 which is pivoted at 396. The lever 394 is linked to the latch 374 by a pin 398 which rides in a slot 400 in the latch. When the lever 394 is rocked by the solenoid against the pull of a restoring spring 402, the shoulder 372 of the latch is moved clear of the end of the lever 370 which then permits the clutch member 368 to descend and engage the constantly rotating clutch member 366. As the arm 380 revolves with the shaft 364, the lug 382 moves clear of the rock arm 376 permitting this arm to be rocked by a spring 404. This elevates the latch 374 so that its shoulder 372 again engages over the end of the lever 370. When the arm 380 completes its revolution, the lug 382 engages the rock arm 376 and rocks it to the position shown in Figure 29. The lever 370 is thus rocked to disengage the clutch so that the arm 380 remains as shown until the solenoid 390 is again energized.

Figure 2:
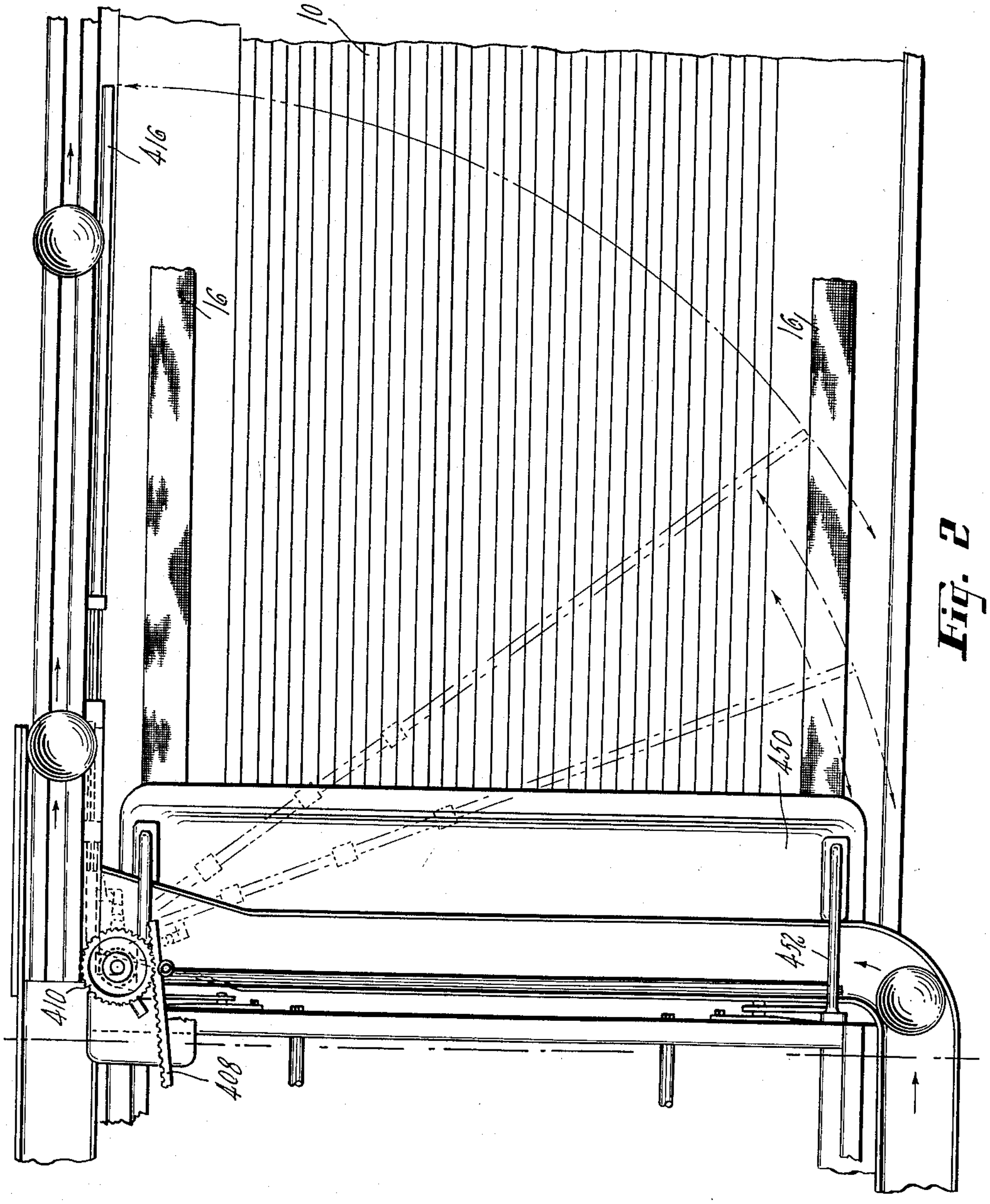
Figure 3:
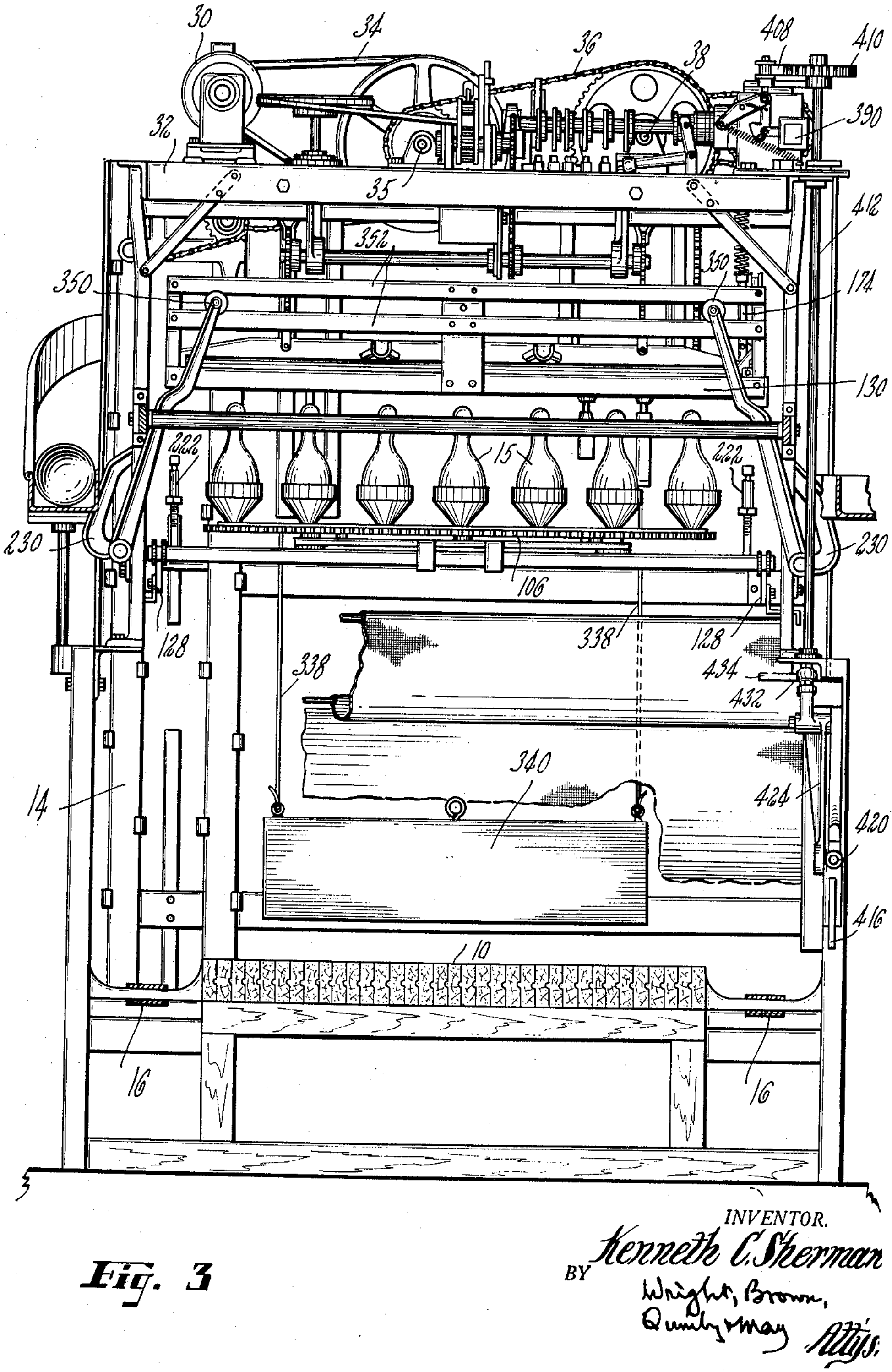
Figure 4:
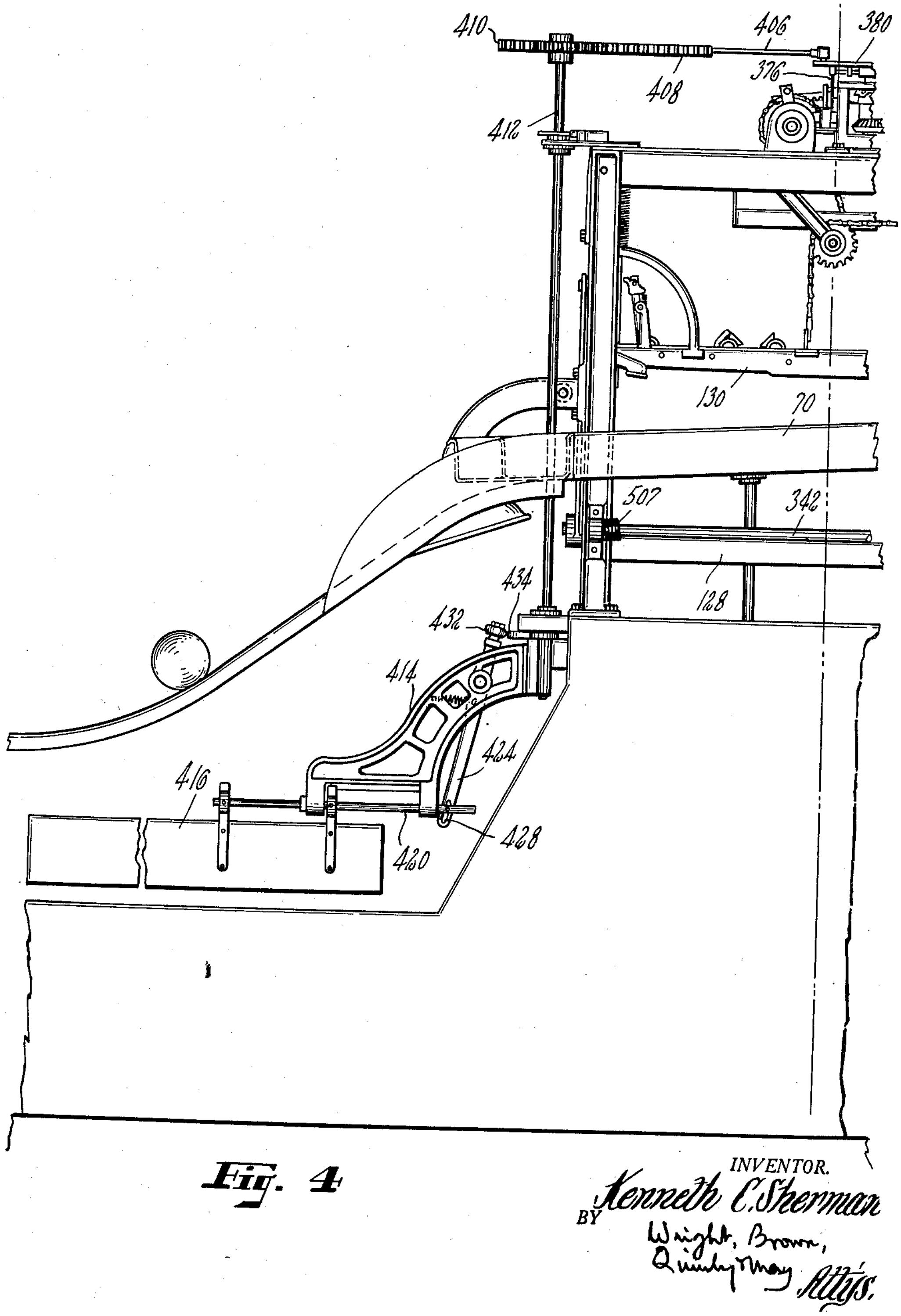

The end of the arm 380 is connected to a rod 406 which is an extension of a rack 408. The rack meshes with a pinion 410 mounted on a vertical shaft 412 (Figure 8). The shaft 412 is journalled in suitable bearings on the main frame. Fixed to the lower end of the shaft 412 is a bracket 414 which carries a sweep blade 416 which it swings 180° in an arcuate path from a position at the side of the alley (Figure 2). Since duck pins often rebound from the back stop for a considerable distance forward on the alley, the sweep is located to sweep as far forward as possible and still cover the pin plate. Since the length of the blade is limited to the width of the alley, means are provided for retracting the blade longitudinally when it approaches the 90 degree position in its swing. For this purpose the blade is slidably supported on the bracket by a horizontal rod 420 which is secured to the blade by straps 422 and extends slidably through the lower portion of the bracket. To shift the blade in and out a rocking lever 424 is pivotally mounted on the bracket 414 at 426. The lower end of the lever has a short slot 428 in which rides a pin 430 which is mounted in the rod 420. At the upper end of the lever 424 is a cam follower 432 which is pressed against a cam plate 434 by a spring 436 attached to the lever 424 and the bracket 414. When the blade is swung through a sweeping movement (Figures 2 and 8*a*) it maintains its extended position relative to the bracket 414 until its tip nearly touches the kick-back on the other side of the alley. Then the cam 434 operates to rock the lever 424 and retract the blade just enough to keep its tip from touching the kick-back. The retraction is at its maximum when the blade reaches its 90-degree position and extends directly across the alley. From then on the lever 424 is swung by the spring 436 to project the blade outward to its limit in which position the blade completes its swing. A similar retraction and projection of the blade occurs during the return swing when the blade resumes its normal position of rest.

To illuminate the alley plate and the pins thereon an elongated lamp shade 450 may be supported by brackets 452 to extend across the alley and to direct light downward and rearward from suitable lamps (not shown) thereunder.

At the rear of the pit the customary vertical cushion 460 is of any desired construction. For convenience this cushion may be rockably supported at its upper corners from the kick-backs by rollers 461. These are on rails 462 (Figure 5) so that the cushion can readily be moved forward away from the back wall of the alley when it is necessary to get at the elevator or other parts of the machine for servicing or repairs. Ordinarily the cushion is held in place by links 463 which are bolted to the rails. A canvas shield 464 extends from a rod 466 along the upper edge of the cushion 460 to a transverse rod 468 attached to the main frame over the forward end of the pit to prevent ricocheting pins or balls from flying up and injuring the pin handling apparatus located above the pit.

For a reset operation, the distributor with a pin in each of its cups is moved to its forward position under the table 130, the sweep then being started to clear the alley. The table descends to the distributor, grips the pins and rises to its top position. The distributor is retracted to its loading position, the table descends to the alley, releases the pins, and returns to its top or latched position. These movements are brought about as follows.

A push button (not shown) is mounted on the customary newel post at the end of the ball storage rack. This button is in series with the micro-switch 138 through a relay (not shown) to energize the electrically operated clutch 302 (Figure 1). When the button is pushed, the clutch 302 engages, and the shaft 300 revolves to move the distributor frame forward to a position under the pinsetting table. Just before the distributor reaches this position a finger 460 on the shaft 300 touches a switch 462 to energize the solenoid 390 (Figures 1 and 28) on the sweep gear box 250, causing the sweep to clear the alley for a new set of pins. At the same time a tail 500 on the crank arm 304 (Figure 7) trips a hook 502 which is pivoted at 504 to release a stud 506 on the arm 324. This permits the shaft 320 to be rocked clockwise by the descent of the pin setter table which is impelled by the spring 184 (Figure 11) aided by auxiliary springs 507 (Figures 4 and 8) on shafts 342. The downward movement of the table is limited by the four adjustable posts 222 on the distributor frame. As the table engages these posts, a finger 508 on shaft 320 which has been rotating during the descent of the table touches a microswitch 510 energizing the electrically operated clutch 322. This rotates the shaft 320 counterclockwise (Figure 7) and raises the table to its latched position. Just before the table reaches this position, a finger 512 on the shaft 320 touches a switch 514 causing clutch 302 to engage for a half revolution of the shaft 300, returning the distributor table rearward to its normal position. A finger 516 on shaft 300 touches a switch 518 just before the distributor reaches its normal position. This causes clutch 322 to engage, causing the pin table 130 to descend to the alley, release the set of pins thereon and return to its latched position.

When the table 130 leaves its latched position at the beginning of a reset operation, the pin-gripping bars 140 and 142 are open or separated as indicated in Figure 11. When the table descends to the posts 222 on the distributor, the trigger 220 which is carried by the table hits one of these posts and is tripped thereby. This results in the closing of the grippers to the position shown in Figure 15, as hereinafter described, the set of pins on the distributor thus being gripped. The table is at once elevated, lifting the pins from the distributor cups. The distributor is retracted, and the table descends to set the pins on the alley plate. The gripper bars release the pins and the table rises to its latched position.

In performing a deadwood operation, the table 130 descends from its latched position to the alley where it grips the standing pins, lifts them to its top position as the sweep operates, then descends to replace the pins on the alley, whereupon the pins are released and the table rises to its latched position again.

To initiate an operation to remove deadwood from the alley, a switch (not shown) is closed by pressing a button which is set in the alley approach at a convenient location to be pressed by the bowler's foot. This acts through a relay (not shown) to cause clutch 322 to engage, starting the table 130 on its descent to pick up standing pins. Just before the table reaches its lower limit a finger 526 on shaft 320 touches a switch 528 in a circuit which is activated when the deadwood button is pressed. This energizes the solenoid 524 to start a sweeping operation. The table then picks up the standing pins and raises them to its latched position while the sweep clears the alley. On the return of the sweep, a cam 530 (Figure 28) on shaft 364 touches switch 532 energizing clutch 322 to cause one revolution of shaft 320 to lower the table, deliver the pins and raise the table again.

At the end of each reset or deadwood operation, a cam 540 on the shaft 364 opens a switch 542 to release the relays which have been locked in the course of the operation.

I claim:

1. In a pin setting machine, a frame, a rectangular pin-carrying table disposed horizontally in the frame, means providing two parallel and horizontal tracks respectively at the two opposite ends of the table, two parallel shafts carried by the frame at the two opposite sides of the table, two arms fixed to each shaft, means including a member on the free end of each arm engaging the adjacent track for supporting the table on the arms for vertical movement in the frame, and means carried by the table for releasably engaging and supporting a plurality of bowling pins.

2. The combination defined in claim 1 plus means at each track connecting the free ends of the two arms associated therewith for equal and simultaneous movement in opposite directions along the track.

3. The combination defined in claim 2, each said connecting means comprising a pinion rotatably mounted on said table at an end thereof, a horizontal rack above said pinion attached to the free end of one of the arms at the same end of the table, a second rack below said pinion attached to the free end of the other arm at the same end of the table, and means maintaining both said racks in meshed engagement with said pinion.

4. In a bowling pin setting machine a pin magazine including a pin guiding channel and an endless conveyor having a straight top reach forming the bottom of the channel, means for driving the conveyor in a direction to move pins on the reach through the exit end of the channel, pin stop means at the exit end of the channel, a pin receiving bucket at and beneath the exit end of the channel in position to receive a pin in upright position therefrom and including a bottom gate supporting the pin in the bucket, a pin distributor beneath the bucket and including a plurality of pin receiving cups, means for actuating said distributor to cause the said cups to move in succession through a pin receiving position directly beneath the said bucket, means on said bucket engageable by a cup reaching the pin receiving position to open the gate and release the pin then in the bucket, and means functioning thereupon to operate the stop means to release the foremost pin to feed into the bucket.

5. The combination defined in claim 4 in which said pin releasing means includes a pair of bottom gates on the bucket pivoted for outward separating movement on two vertical axes and two downwardly extending abutments carried by the gates in position to be engaged and separated by a cup as it reaches said pin receiving position.

6. The combination defined in claim 4 plus driving means including a clutch for moving the cups successively past the pin receiving position, a solenoid energizable to disengage said clutch whereby to stop the movement of said cups when a cup is in a pin receiving position, an electric switch connected in series with said solenoid, and switch operating means including a member in said channel near said stop means engageable by a pin passing said member in said channel to close said switch, said switch being open when said member is not engaged by a pin.

7. A distributor for bowling pins, comprising a frame, three spaced sprocket wheels mounted in triangular relation and in a common horizontal plane on the frame, a fourth sprocket wheel disposed midway between two of the sprocket wheels and to the rear of the third sprocket wheel, a continuous endless band extending outwardly around the three sprocket wheels and inwardly around the fourth sprocket wheel, idlers supporting the band between each of said two sprocket wheels and said third sprocket wheel, ten pin receiving cups mounted in spaced relation on the band, the arrangement of the wheels and the spacing of the cups being such that when any one of the cups is in its extreme forward position on the frame, the other nine cups are located relatively to it and to one another forming the standard triangular array which pins assume when set up on an alley plate, means for shifting said distributor a fixed distance forward and rearward between a loading position and a discharging position, driving means operatively connectible to one of said wheens when the distributor is in its loading position to feed said band and advance said cups, means for stopping said band when the cups are substantially in said triangular array, and means operated by shifting movement of said distributor from its loading position to cause whatever adjustive movement of said band may be necessary to locate said cups accurately in said standard triangular array.

References Cited in the file of this patent

UNITED STATES PATENTS

| | | |
|---|---|---|
| 1,090,713 | Hildebrand | Mar. 17, 1914 |
| 1,573,643 | Proch | Feb. 16, 1926 |
| 1,784,084 | Williams | Dec. 9, 1930 |
| 2,306,825 | McGill | Dec. 29, 1942 |
| 2,341,476 | Parra et al. | Feb. 8, 1944 |
| 2,388,708 | Bates | Nov. 13, 1945 |
| 2,518,457 | Fretter | Aug. 15, 1950 |
| 2,531,167 | Simpson | Nov. 21, 1950 |
| 2,620,187 | Whipple et al. | Dec. 2, 1952 |
| 2,634,979 | Schon | Apr. 14, 1953 |
| 2,654,605 | Hackert | Oct. 6, 1953 |
| 2,672,341 | Flint | Mar. 16, 1954 |
| 2,692,139 | Dumas | Oct. 19, 1954 |
| 2,697,604 | Blair | Dec. 21, 1954 |
| 2,697,605 | Montooth | Dec. 21, 1954 |
| 2,705,145 | Fluke et al. | Mar. 29, 1955 |
| 2,736,554 | Fluke | Feb. 28, 1956 |